United States Patent
Noda et al.

(10) Patent No.: US 7,902,098 B2
(45) Date of Patent: Mar. 8, 2011

(54) CUBIC BORON NITRIDE SINTERED MATERIAL AND CUTTING TOOL USING THE SAME

(75) Inventors: Kenji Noda, Satsumasendai (JP); Daisuke Shibata, Satsumasendai (JP)

(73) Assignee: Kyocera Corporation, Kyoto (JP)

(*) Notice: Subject to any disclaimer, the term of this patent is extended or adjusted under 35 U.S.C. 154(b) by 1146 days.

(21) Appl. No.: 11/569,353

(22) PCT Filed: Oct. 26, 2005

(86) PCT No.: PCT/JP2005/020061
§ 371 (c)(1),
(2), (4) Date: Nov. 17, 2006

(87) PCT Pub. No.: WO2006/046753
PCT Pub. Date: May 4, 2006

(65) Prior Publication Data
US 2007/0227297 A1    Oct. 4, 2007

(30) Foreign Application Priority Data

Oct. 28, 2004 (JP) .................. 2004-314592
Feb. 24, 2005 (JP) .................. 2005-049771
Mar. 29, 2005 (JP) .................. 2005-095855
Mar. 29, 2005 (JP) .................. 2005-095857
Mar. 29, 2005 (JP) .................. 2005-096111

(51) Int. Cl.
*C04B 35/5831* (2006.01)
*C04B 35/56* (2006.01)
*C04B 35/00* (2006.01)
*C01B 21/064* (2006.01)
*C01B 31/34* (2006.01)
*D02G 3/00* (2006.01)
*B32B 9/00* (2006.01)

(52) U.S. Cl. ......... 501/95.1; 501/87; 501/96.4; 423/290; 423/440; 428/364; 428/366; 428/367; 428/372; 428/373; 428/375; 428/392

(58) Field of Classification Search .............. 501/87, 501/95.1, 96.4; 423/290, 440; 75/238; 428/364, 428/366, 367, 372, 373, 375, 392
See application file for complete search history.

(56) References Cited

U.S. PATENT DOCUMENTS
4,693,746 A    9/1987 Nakai et al.
(Continued)

FOREIGN PATENT DOCUMENTS
CN    1487906 A    4/2004
(Continued)

OTHER PUBLICATIONS

Chinese language office action and its English language translation for corresponding Chinese application 200580033358.3.

(Continued)

*Primary Examiner* — David M. Brunsman
*Assistant Examiner* — Kevin M Johnson
(74) *Attorney, Agent, or Firm* — DLA Piper LLP (US)

(57) ABSTRACT

A cubic boron nitride sintered material where wear resistance is suppressed from decreasing having excellent chipping resistance and a cutting tool made thereof are provided. The sintered material is constituted from cubic boron nitride particles that are bound by a binder phase, while the binder phase contains a carbide of at least one kind of metal element selected from among metals of groups 4, 5 and 6 of the periodic table and a nitride of at least one kind of metal element selected from among metals of groups 4, 5 and 6 of the periodic table coexisting therein, and therefore the particles can be suppressed from coming off and the binder phase can be suppressed from wearing and coming off at the same time, thereby making the sintered material having high wear resistance and particularly excellent chipping resistance.

33 Claims, 9 Drawing Sheets

U.S. PATENT DOCUMENTS

| | | | |
|---|---|---|---|
| 5,536,485 A * | 7/1996 | Kume et al. | 423/446 |
| 5,882,777 A * | 3/1999 | Kukino et al. | 428/216 |
| 2003/0008160 A1* | 1/2003 | Sue et al. | 428/469 |

FOREIGN PATENT DOCUMENTS

| | | |
|---|---|---|
| EP | 0102843 A2 | 3/1984 |
| EP | 1359130 A1 | 11/2003 |
| EP | 1498199 A1 | 1/2005 |
| JP | 52-043846 | 2/1977 |
| JP | 02-310334 | 12/1990 |
| JP | 04-322903 | 11/1992 |
| JP | 06028805 B2 | 4/1994 |
| JP | 2002226273 A | 8/2002 |
| JP | 2003-175407 | 6/2003 |
| JP | 2003-342614 | 12/2003 |

OTHER PUBLICATIONS

Korean language office action and its English language translation for corresponding Korean application 20077004920 lists the references above.

* cited by examiner

[Fig. 1]
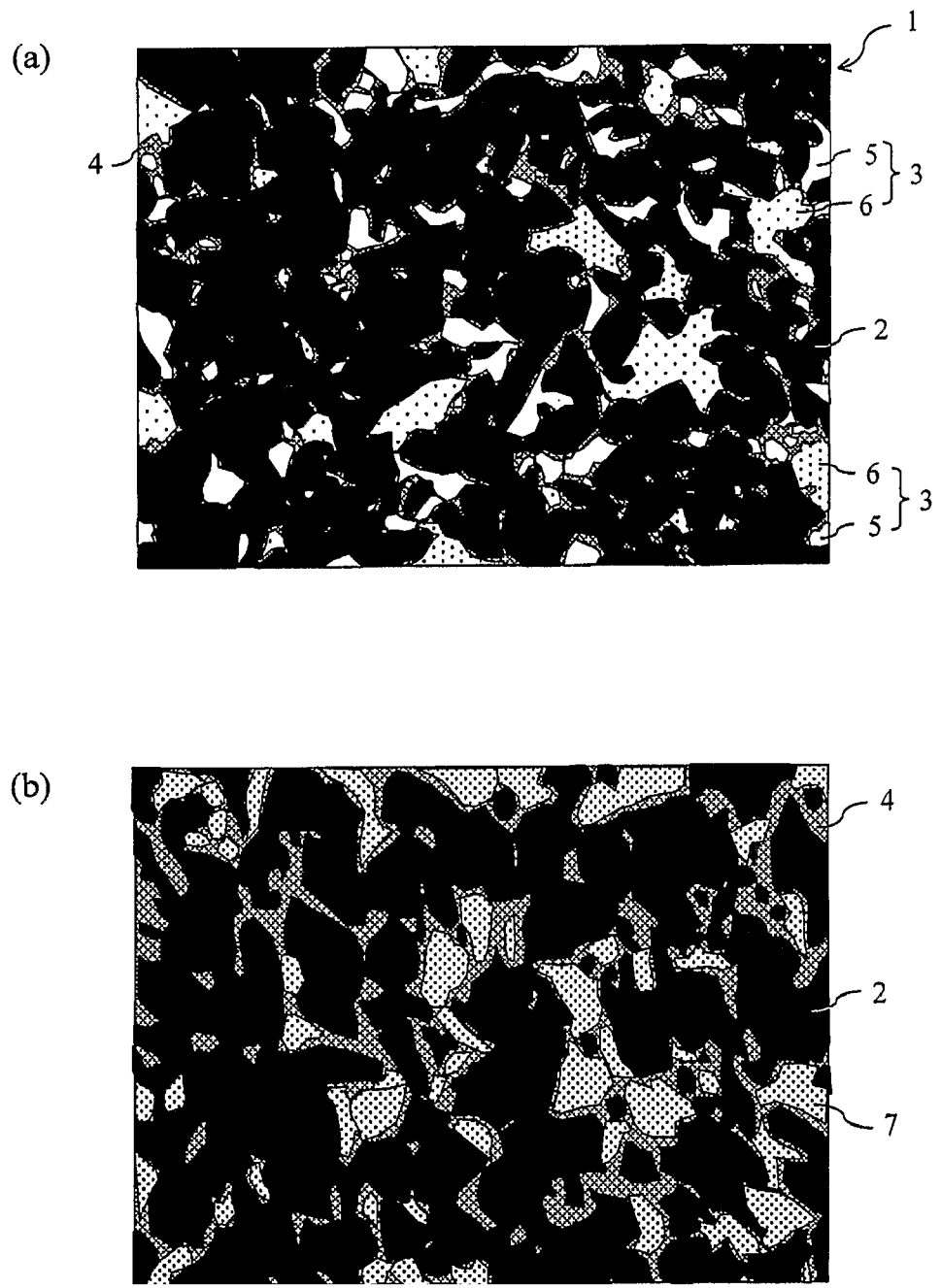

[Fig. 2]
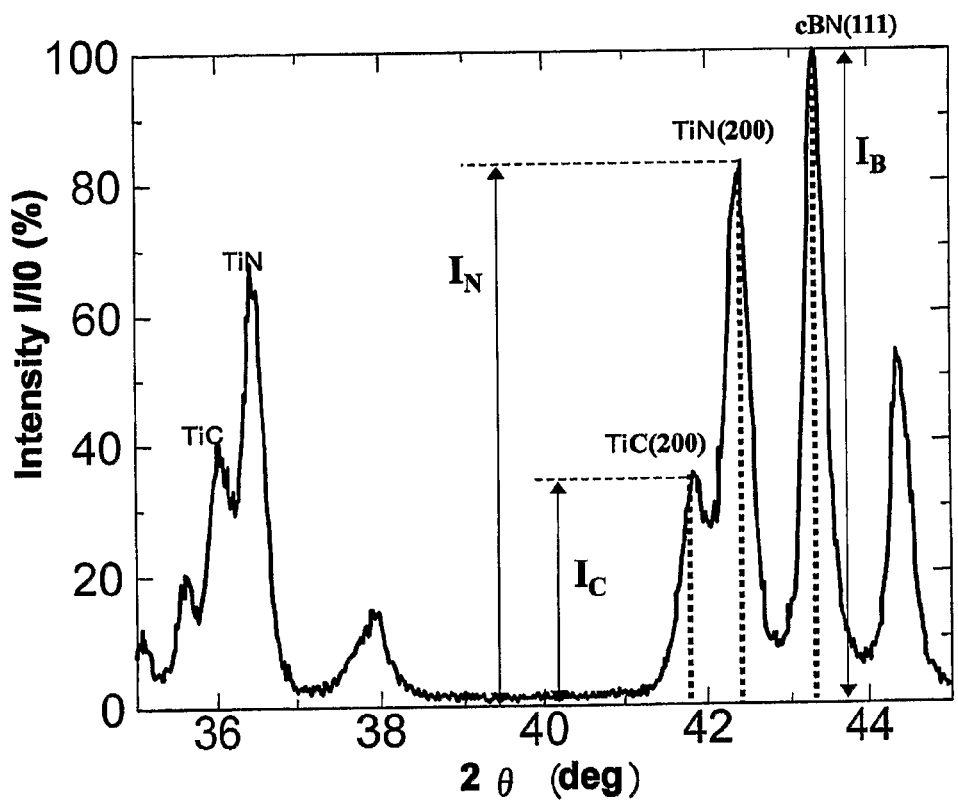
[Fig. 3]
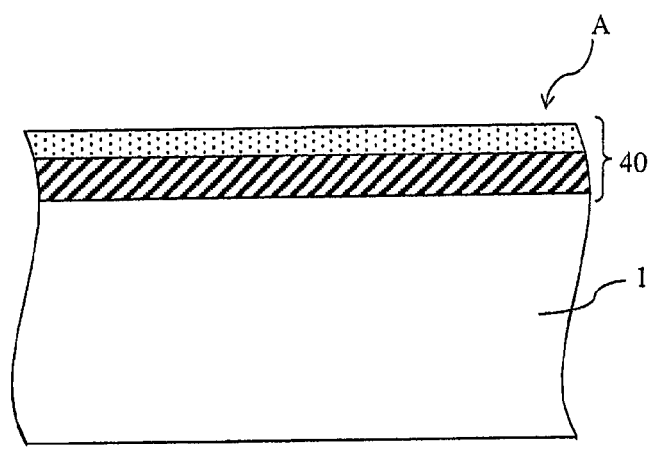

[Fig. 4]
(a)
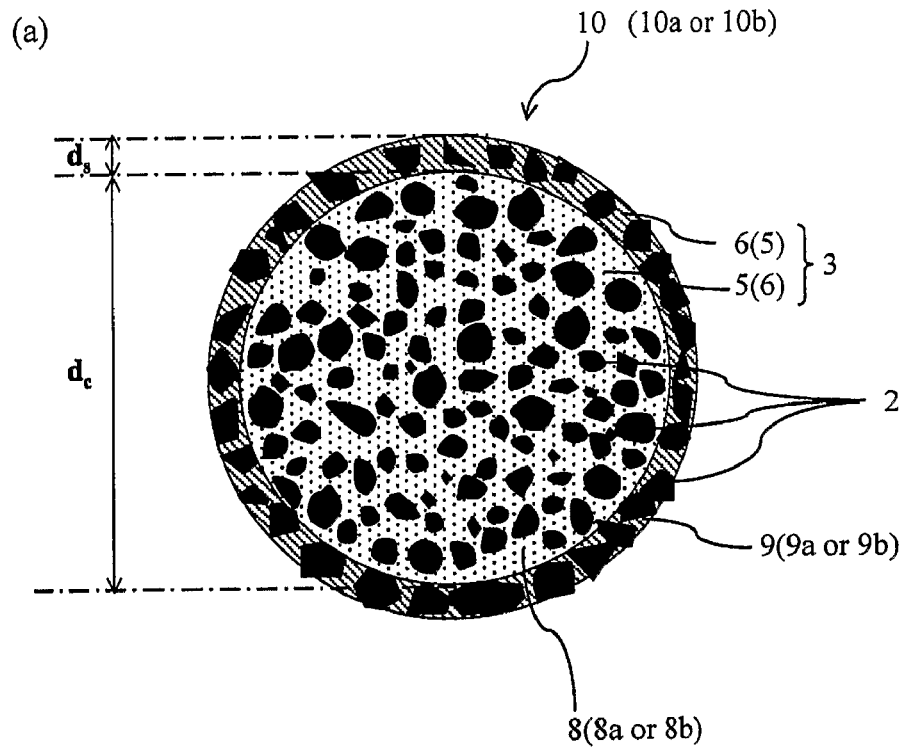
(b)
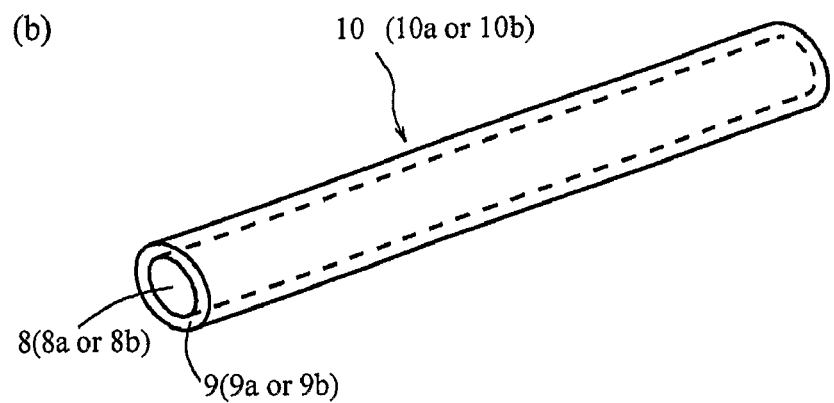

[Fig. 5]
(a)
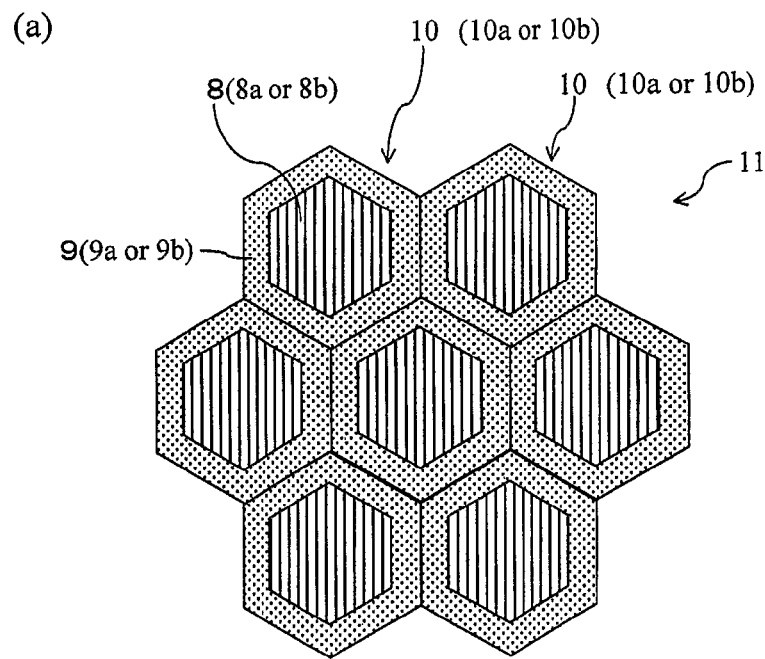
(b)
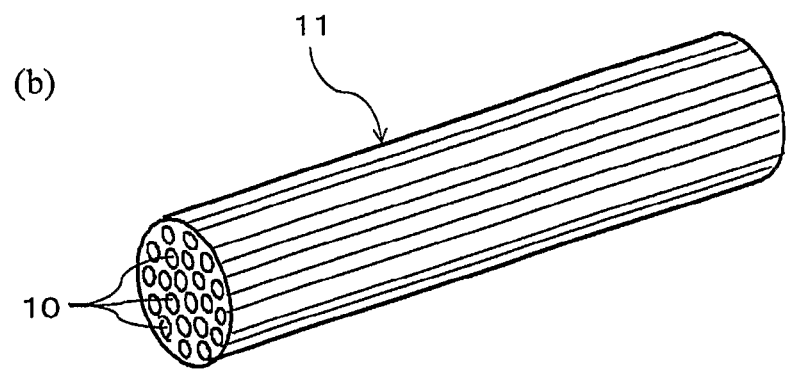

[Fig. 6]
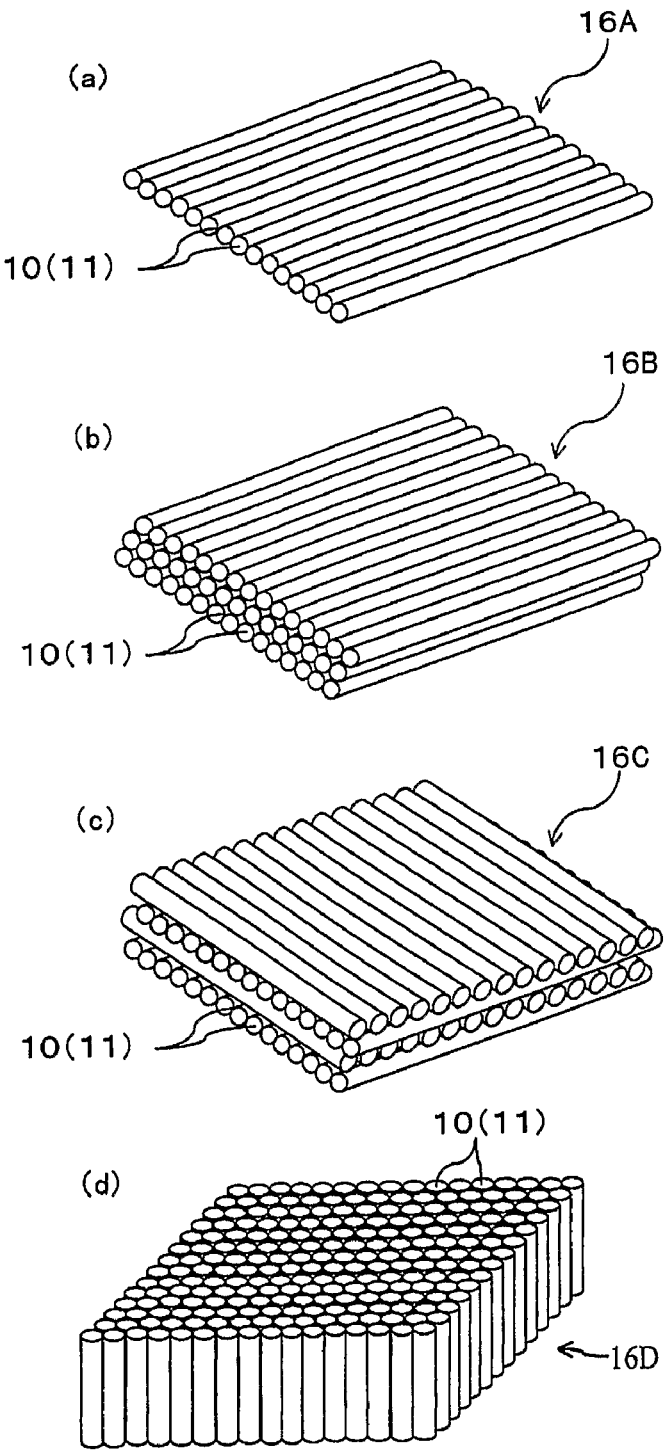

[Fig. 7]
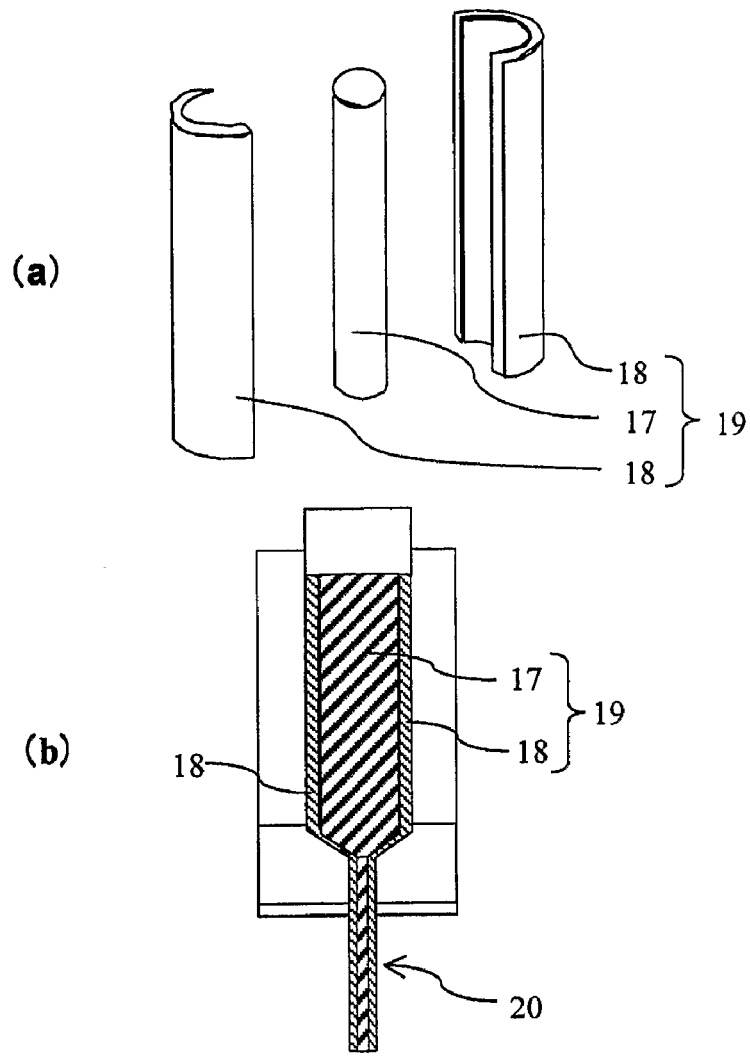

[Fig. 8]
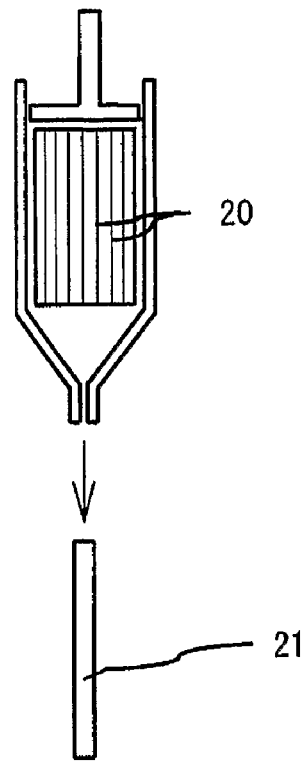
[Fig. 9]
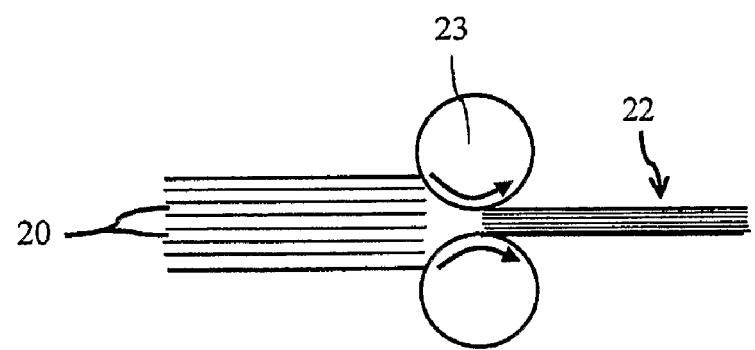

[Fig. 10]
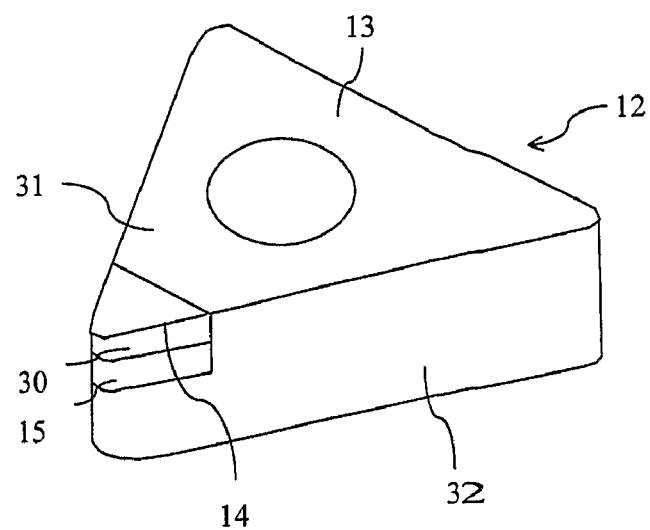

[Fig. 11]
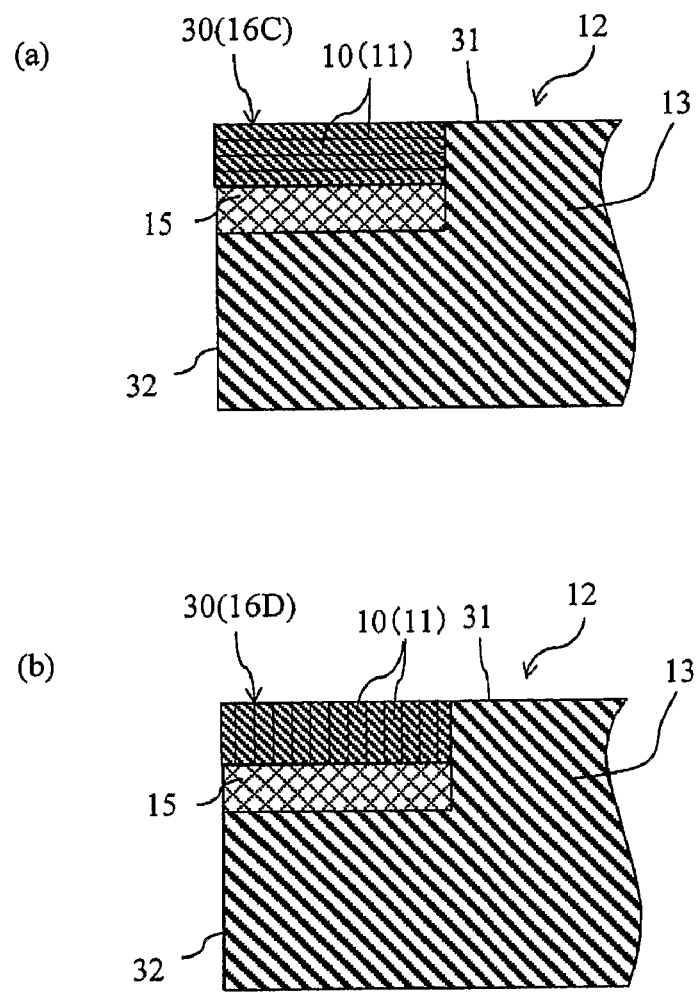

CUBIC BORON NITRIDE SINTERED MATERIAL AND CUTTING TOOL USING THE SAME

RELATED APPLICATIONS

This application claims priority under 35 U.S.C. §371 from PCT Application No. PCT/JP05/20061 filed on Oct. 26, 2005, which claims the benefit of Japanese Application No. 2004-314592 filed Oct. 28, 2004, Japanese Application No. 2005-049771 filed Feb. 24, 2005, and Japanese Application No. 2005-095855 filed Mar. 29, 2005.

TECHNICAL FIELD

The present invention relates to a cubic boron nitride sintered material constituted from cubic boron nitride particles bound by a binding phase and to a cutting tool that uses the same.

BACKGROUND ART

Cubic boron nitride (cBN) is characterized by a high hardness next only to diamond, and yet not having reactivity with ferrous metals unlike diamond. Accordingly, cubic boron nitride sintered material (cBN sintered material) is used in tools for cutting ferrous materials, especially hardened steel and cast iron.

When a cutting tool is made of cBN sintered material, for example, cBN sintered material made by sintering cBN under an ultra-high pressure has been used with a metal such as cobalt (Co) and ceramics such as titanium carbide (TiC) contained as binder in a concentration from 10 to 60% by volume, according to Patent Document 1. It is also proposed in Patent Document 1 to keep the binder phase to a minimum amount and form such a structure that cBN of the rest is directly bonded with each other, in order to avoid compromising wear resistance and heat resistance of the cBN sintered material.

Recently, in the field of metal cutting, there are demands to increase the efficiency of cutting operation and provide the capability to machine hard-to-cut materials. And cBN sintered material is also required to improve wear resistance and chipping resistance, as the basic requirements. Patent Document 2 proposes a cBN sintered material wherein cBN particles are bound by a large amount of binder constituted from ceramics such as titanium carbonitride (TiCN), an intermetallic compound of Ti and Al and tungsten carbide (WC) for the purpose of improving the properties described above.

[Patent Document 1] Japanese Examined Patent Publication (Kokoku) No. 52-43846

[Patent Document 2] Japanese Unexamined Patent Publication (Kokai) No. 2003-175407

DISCLOSURE OF THE INVENTION

Problems to be Solved by the Invention

However, when hardened steel or cast iron is cut with a cutting tool made from the cBN sintered material described in Patent Document 1, there has been such a problem that cBN particles come off from the sintered body during the cutting operation, thus causing wear of the cutting tool to proceed significantly.

With the method of adding a large amount of binder described in Patent Document 2, there have been such problems that, though it is made possible to restrict the cBN particles from coming off and wear from rapidly proceeding, the binder phase constituted from titanium carbonitride (TiCN), the intermetallic compound of Ti and Al and tungsten carbide (WC) has lower mechanical property and lower thermal property. As a result, wear and fall-off of the binder phase become conspicuous and cause wear and chipping of the tool, thus making it impossible to elongate the tool life.

An object of the present invention is to provide a cBN sintered material that is capable of restricting wear resistance from decreasing and has excellent chipping resistance, and a cutting tool that uses the same.

Means for Solving the Problems

The present inventors made a research to solve the problems of progress in wear and chipping of the tool at the same time. Through the research, it was found that a cBN sintered material constituted from cBN particles that are bound by a binder phase, when the binder phase contains a carbide of a particular metal element and a nitride of a particular metal element coexisting therein, shows excellent properties that cannot be achieved by using a binder phase constituted from a carbide, a nitride or a carbonitride that is a solid solution thereof. It was also found that the cBN sintered material having such a constitution is capable of suppressing the cBN particles from coming off and the binder phase from wearing and coming off at the same time, thus exhibiting high wear resistance and, especially, excellent chipping resistance, thus completing the present invention.

Specifically, the cBN sintered material of the present invention is a cBN sintered material constituted from cBN particles that are bound by a binder phase, wherein the binder phase contains a carbide of at least one kind of metal element selected from among a group consisting of groups 4, 5 and 6 of the periodic table and a nitride of at least one kind of metal element selected from among a group consisting of groups 4, 5 and 6 of the periodic table coexisting therein.

Another cBN sintered material of the present invention has such a single-filament fiber-like structure that a shell member made of the cBN sintered material constituted from cBN particles that are bound by a binder phase made of nitride of at least one kind of metal element selected from among a group consisting of groups 4, 5 and 6 of the periodic table covers the circumferential surface of a fiber-like core member made of the cBN sintered material constituted from cBN particles that are bound by a binder phase made of carbide of at least one kind of metal element selected from among a group consisting of groups 4, 5 and 6 of the periodic table.

Further another cBN sintered material of the present invention has such a single-filament fiber-like structure that a shell member made of cBN sintered material constituted from cBN particles that are bound by a binder phase made of carbide of at least one kind of metal element selected from among a group consisting of groups 4, 5 and 6 of the periodic table covers the circumferential surface of a fiber-like core member made of cBN sintered material constituted from cBN particles that are bound by binder phase made of nitride of at least one kind of metal element selected from among a group consisting of groups 4, 5 and 6 of the periodic table.

The cutting tool of the present invention is made of the cBN sintered material of the present invention described above, and is used in metal cutting operations with a cutting edge, that is formed along a ridge where a flank and a rake face thereof meet, pressed against a workpiece to be cut.

Effects of the Invention

The cBN sintered material of the present invention is characterized principally by the fact that a carbide of a particular metal element and a nitride of a particular metal element coexist therein. This enables it to achieve both a level of strength of the binder phase and a level of bonding force between the binder phase and the cBN particles, that cannot be obtained with the conventional sintered material that uses the binder phase constituted from a carbide, a nitride or a carbonitride that is a solid solution thereof. As a result, it is made possible to suppress the cBN particles from coming off and the binder phase from wearing and coming off at the same time, thus providing the cBN sintered material having high wear resistance and greatly improved chipping resistance.

In consequence, the cBN sintered material and the cutting tool of the present invention are capable of, as well as cutting operations under normal conditions, interrupted cutting of hard-to-cut materials such as hardened steel with excellent wear resistance and chipping resistance.

BRIEF DESCRIPTION OF THE DRAWINGS

FIG. 1(a) is a schematic diagram showing the structure of the cBN sintered material of the present invention, and FIG. 1(b) is a schematic diagram showing the structure of the cBN sintered material having a binder phase of uniform composition.

FIG. 2 is an X-ray diffraction analysis chart of the cBN sintered material of the present invention showing the diffraction peaks.

FIG. 3 is a schematic sectional view showing cBN sintered material according to a fifth embodiment.

FIG. 4(a) is a schematic sectional view showing the cBN sintered material having single-filament fiber-like structure of the present invention, and FIG. 4(b) is a perspective view of (a).

FIG. 5(a) is a schematic sectional view showing the cBN sintered material having multi-filament fiber-like structure of the present invention, and FIG. 5(b) is a perspective view of (a).

FIGS. 6(a) to 6(d) are schematic perspective views showing examples of arranging the cBN sintered material having fiber-like structure of the present invention.

FIGS. 7(a) and 7(b) are schematic diagrams showing a method of manufacturing a composite green compact according to the method of manufacturing the cBN sintered material having single-filament fiber-like structure of the present invention.

FIG. 8 is a schematic diagram showing a method of manufacturing a green compact according to the method of manufacturing the cBN sintered material having multi-filament fiber-like structure of the present invention.

FIG. 9 is a schematic diagram showing a method of manufacturing a green compact having another form according to the method of manufacturing the cBN sintered material having multi-filament fiber-like structure of the present invention.

FIG. 10 is a perspective view showing an embodiment of the cutting tool according to the present invention.

FIG. 11(a) is a schematic sectional view showing an example of the structure of a tool tip corner of the present invention, and FIG. 11(b) is a schematic sectional view showing another example.

DESCRIPTION OF REFERENCE NUMERALS

| | |
|---|---|
| 1 | cBN sintered material |
| 2 | cBN particles |
| 3 | Binder phase |
| 4 | Intermediate phase |
| 5 | Carbide |
| 6 | Nitride |
| 7 | Carbonitride |
| 8 | Fiber-like core member made of cBN sintered material |
| 8a | Fiber-like core member made of cBN sintered material (Binder phase is formed from carbide.) |
| 8b | Fiber-like core member made of cBN sintered material (Binder phase is formed from nitride.) |
| 9 | Shell member made of cBN sintered material |
| 9a | Shell member made of cBN sintered material (Binder phase is formed from nitride.) |
| 9b | Shell member made of cBN sintered material (Binder phase is formed from carbide.) |
| 10 | cBN sintered material having single-filament fiber-like structure |
| 10a | First cBN sintered material |
| 10b | Second cBN sintered material |
| 11 | cBN sintered material having multi-filament fiber-like structure |
| 12 | Tool tip |
| 13 | Tool insert |
| 14 | Cutting edge |
| 15 | Backing member |
| 16 | Sheet-like structure |
| 16A | Composite cBN sintered material arranged in sheet-like configuration |
| 16B | Sheet-like arrangement of 16A stacked with fibers in parallel |
| 16C | Sheet-like arrangement of 16A stacked with fibers perpendicular to each other |
| 16D | Sheet-like arrangement of 16A stacked with fibers perpendicular to sheet surface |
| 17 | Green compact of core member |
| 18 | Green compact of shell member |
| 19 | Composite green compact |
| 20 | Composite green compact having single-filament fiber-like structure |
| 21 | Composite green compact having multi-filament fiber-like structure |
| 22 | Composite green compact having sheet shape |
| 23 | Roll |
| 30 | cBN sintered material for cutting tool |
| 31 | Rake face |
| 32 | Flank face |
| 40 | Hard coating film |
| $I_{cBN}$ | Highest peak in X-ray diffraction analysis of cBN particles |
| $I_N$ | Peak intensity of nitride from (200) plane in X-ray diffraction analysis |
| $I_C$ | Peak intensity of carbide from (200) plane in X-ray diffraction analysis |
| $d_C$ | Diameter of core member |
| $d_S$ | Thickness of shell member |

MODE FOR CARRYING OUT THE INVENTION cBN Sintered Material

Preferred embodiments of the cBN sintered material according to the present invention will now be described in detail with reference to the accompanying drawings.

First Embodiment

FIG. 1(a) is a schematic diagram showing the structure of the cBN sintered material according to first embodiment of the present invention. As shown in FIG. 1(a), the cBN sintered material 1 consists of cBN particles 2 (black portions in FIG.

1(a)) and a binder phase 3. Specifically, the cBN sintered material 1 is constituted from the cBN particles 2 that constitute the hard phase bound together by the surrounding binder phase 3. The cBN sintered material also has an intermediate phase 4 disposed between the cBN particles 2 and the binder phase 3, for binding the cBN particles 2 and the binder phase 3.

In the binder phase 3 of this embodiment, carbide 5 of at least one kind of metal element selected from among a group consisting of groups 4, 5 and 6 of the periodic table and nitride 6 of at least one kind of metal element selected from among a group consisting of groups 4, 5 and 6 of the periodic table coexist. When the binder phase 3 is made in this constitution, it is made possible to increase the strength of the binder phase 3 and increase the bonding force between the binder phase and the cBN particles 2 at the same time, and also generate residual stress between the binder phase 3 and the cBN particles 2 thereby ensuring firm binding between the cBN particles 2. As a result, it is made possible to suppress the cBN particles 2 from coming off and the binder phase from wearing, thus providing the cBN sintered material 1 having high wear resistance and, especially, excellent chipping resistance. The phrase that the carbide 5 and the nitride 6 coexist means the state of the carbide 5 and the nitride 6 exist independently from each other in the binder phase 3.

In case the binder phase 3 has a uniform composition of carbonitride 7 that is a solid solution of carbide and nitride as shown in FIG. 1(b), it is not possible to increase the strength of the binder phase and increase the bonding force between the binder phase and the cBN particles 2 at the same time. In case the binder phase 3 is constituted from the carbide 5 only, on the other hand, bonding force between the binder phase 3 and the cBN particles 2 decreases, thus resulting in sintering failure or fall-ff of the cBN particles 2. This leads to breakage or chipping when subjected to impact. In case the binder phase 3 is constituted from the nitride 6 only, on the other hand, wear resistance decreases significantly.

In the case of a structure formed from the combination of the core member and the shell member as in the case of the cBN sintered materials 10, 11 of fiber-like structure to be described later, properties of the core member and the shell member can be put into action in a well-balanced manner by making one of the binder phases of the core member and the shell member from carbide and the other from nitride, thus causing the cBN sintered material 10, 11 to exhibit the best performance.

Coexistence of the carbide 5 and the nitride 6 in the binder phase 3 may be confirmed by, for example, polishing the cBN sintered material 1 in mirror finish and observing the polished surface under a metallurgical microscope with magnification factor of 100 to 1000. When titanium, for example, is used as the metal element to form the carbide 5 and the nitride 6, the brightest portions represent the carbide 5 and the darkest portions represent the cBN particles 2, while portions having intermediate brightness representing the nitride 6.

Coexistence of the carbide 5 and the nitride 6 in the binder phase 3 may also be confirmed by mapping the component analysis. In case EPMA (electron probe microanalysis) is carried out by using a WDS (wavelength-dispersion type X-ray spectrometer), for example, coexistence of the carbide 5 and the nitride 6 can be confirmed by mapping carbon, nitrogen, boron and metal elements. Various regions may also be determined whether they consist of carbide 5 or nitride 6 by the X-ray photoelectron spectroscopy (ESCA). In addition, X-ray diffraction analysis to be described later may also be used to effectively confirm the coexistence of the carbide and the nitride.

The metal element that constitutes the carbide 5 and the metal element that constitutes the nitride 6 may be different elements, although they are preferably the same metal elements in order to achieve high strength of the binder phase 3 and strong bonding between the cBN particles 2. It is particularly preferable that the metal element is titanium (Ti), so that the binder phase 3 consists of titanium carbide (TiC) and titanium nitride (TiN). In this case, since titanium has high affinity with the cBN particles 2 so that high residual compressive stress can remain between the cBN particles 2, bonding of the cBN particles 2 becomes stronger thus making the material excellent in wear resistance and in chipping resistance.

Ratio ($p_C/p_N$) of proportion $p_C$ of carbide 5 content in the cBN sintered material 1 to proportion $p_N$ of nitride 6 content is preferably in a range from 0.2 to 3.0, more preferably from 0.5 to 2.0, in order to achieve sufficient effect of suppressing the cBN particles from coming off and the binder phase 3 from wearing and coming off. When the cBN sintered material 1 is used to make a cutting tool, wear resistance can be suppressed from decreasing during cutting operation and the cBN particles 2 can be prevented from coming off, thereby preventing excessive wear from occurring.

It is preferable that there exists, on the circumference of the cBN particles 2 of the cBN sintered material 1, the intermediate phase 4 that contains a compound other than the component of the binder phase 3, that is one of carbide, nitride, carbonitride, boride, borocarbide, boronitride and oxide of at least one metal element selected from among metals of groups 4, 5 and 6 of the periodic table, iron group metals and Al. This constitution enables it to firmly hold the cBN particles 2 together. The intermediate phase 4 may be made of, for example, $TiB_2$, AlN or the like.

It is preferable that proportion $p_{cBN}$ of the cBN particles 2 to the entire cBN sintered material 1 is in a range from 45 to 80% by area, proportion $p_c$ of the carbide 5 is in a range from 2 to 45% by area, proportion $p_N$ of the nitride 6 is in a range from 3 to 50% by area, and proportion $p_m$ of the intermediate phase 4 is in a range from 0 to 25% by area. This makes it possible to make full use of high hardness of the carbide 5 and the binding force between the nitride 6 and the cBN particles 2. Also because this constitution has good balance of the contents of the cBN particles 2, the binder phase 3 and the intermediate phase 4, high hardness and high toughness can be maintained thereby to achieve high wear resistance and high chipping resistance. The percentage by area described above can be calculated, for example, through image analysis of the metallurgical microscope photograph.

It is also preferable that proportion of the carbonitride content that is a solid solution of carbide 5 and nitride 6 is 5% by weight or less of the entire cBN sintered material 1. This increases the proportion of the cBN particles 2 and decreases the proportion of the binder phase 3, thus suppressing the cBN particles 2 from coming off, and the binder phase 3 from wearing and coming off. Content of carbonitride may be determined by measuring the corresponding peak intensity in X-ray diffraction analysis and comparing it with the calibration curve of a standard sample prepared separately.

Mean particle size of the cBN particles 2 is preferably in a range from 0.2 to 5.0 µm, more preferably in a range from 0.5 to 3.0 µm in consideration of wear resistance and strength.

An example of method for manufacturing the cBN sintered material of this embodiment will now be described. First, stock material powder is prepared by weighing a cBN material powder having a mean particle size of 0.2 to 3 µm, a powder of carbide of at least one kind of metal element selected from among metals of groups 4, 5 and 6 of the periodic table having a mean particle size from 0.2 to 3 µm, preferably from 0.5 to 3 µm, more preferably from 1 to 3 µm, and a powder of nitride of at least one kind of metal element selected from among metals of groups 4, 5 and 6 of the periodic table having a mean particle size from 0.2 to 3 µm, preferably from 0.5 to 3 µm, more preferably from 1 to 3 µm. In addition, as required, a powder of Al or at least one kind of iron group metals having a mean particle size from 0.5 to 5 µm is weighed according to a particular composition. These ponders are crushed and milled in a ball mill for a period of 16 to 72 hours.

Then the mixture of crushed powders is formed in a predetermined shape. Known means can be employed in the forming process, for example, press forming, injection molding, casting or extrusion molding.

The green compact is charged in an ultrahigh pressure sintering apparatus together with a backing member made of cemented carbide that is prepared separately, and is held at a temperature from 1200 to 1400° C. under a pressure of 5 GPa for a period of 10 to 30 minutes, thereby to obtain the cBN sintered material of this embodiment. In order to make such a structure that a carbide of one metal selected from among metals of groups 4, 5 and 6 of the periodic table and a nitride of one metal selected from among metals of groups 4, 5 and 6 of the periodic table exist independently, it is preferable to set the rate of raising and lowering the temperature in a range from 30 to 50° C. per minute and the duration of holding the heating temperature (firing period) in a range from 10 to 15 minutes. When the firing temperature, firing pressure holding period, temperature raising rate and temperature lowering rate deviate from the ranges described above, it becomes difficult to control the structure so as to contain carbide and nitride coexisting therein.

Second Embodiment

A second embodiment of the cBN sintered material according to the present invention will now be described. In this embodiment, components that are identical with or similar to those of the first embodiment will be denoted with the same reference numeral and description thereof will be omitted.

The cBN sintered material of this embodiment shows a diffraction peak generated by the nitride 6 and a diffraction peak generated by the carbide 5 coexisting in X-ray diffraction analysis as shown in FIG. 1(a). Specifically as shown in FIG. 2, the cBN sintered material is characterized by the coexistence of a diffraction peak $I_N$ generated by nitride 6 of at least one metal element selected from among metals of groups 4, 5 and 6 of the periodic table (nitride peak) and a diffraction peak $I_C$ generated by carbide 5 of at least one metal element selected from among metals of groups 4, 5 and 6 of periodic table (carbide peak) in X-ray diffraction analysis.

Specifically, the nitride 6 and the carbide 5 coexist with such a level that a diffraction peak attributed to (200) plane of nitride 6 and a diffraction peak attributed to (200) plane of carbide 5 in the X-ray diffraction analysis. This makes it possible to make residual stress remain between the binder phase 3 and the cBN particles 2 shown in FIG. 1(a), make the bonding of the cBN particles 2 stronger and prevent the cBN particles 2 from coming off. Peak intensity I may be estimated in the present invention by separating the peaks from the diffraction chart when the diffraction chart is crowded with various peaks overlapping with each other.

In this embodiment, coexistence of nitride 6 and carbide 5 means that the ratio ($I_C/I_N$) of the intensity $I_C$ of a diffraction peak attributed to (200) plane of carbide 5 to intensity $I_N$ of a diffraction peak attributed to (200) plane of nitride 6 is in a range from 0.5 to 20.

It is preferable to control the ratio ($I_C/I_N$) of the intensity $I_C$ of a diffraction peak attributed to (200) plane of carbide 5 to intensity $I_N$ of a diffraction peak attributed to (200) plane of nitride 6 in a range from 0.2 to 1.2, more preferably from 0.3 to 0.9 as measured by X-ray diffraction analysis. This enables it to prevent the cBN particles 2 from coming off and excessive wear from occurring while preventing wear resistance from decreasing during cutting operation.

It is also preferable to control the ratio ($I_N/I_{cBN}$) of the intensity $I_N$ of a diffraction peak attributed to nitride 6 to intensity $I_{cBN}$ of a diffraction peak attributed to (111) plane of the cBN particles 2 in a range from 0.3 to 1 as measured by the X-ray diffraction analysis described above. This enables it to increase the bonding force between the cBN particles 2 and the binder phase 3 and prevent the cBN particles 2 from coming off while maintaining high hardness, thereby to improve the impact resistance of the cBN sintered material 1.

It is also preferable to control the ratio ($I_C/I_{cBN}$) of the intensity $I_C$ of a diffraction peak attributed to carbide 5 to the intensity $I_{cBN}$ of a diffraction peak attributed to (111) plane of the cBN particles 2 in a range from 0.1 to 0.9 as measured by X-ray diffraction analysis. This enables it to ensure both wear resistance and chipping resistance. Intensities of individual peaks can be determined by separating the peaks from the X-ray diffraction analysis chart.

It is also preferable that intensity $I_{CN}$ of a diffraction peak attributed to (200) plane of carbonitride 7, that is a solid solution of carbide 5 and nitride 6, namely the peak which appears at an intermediate angle between the peak attributed to (200) plane of carbide 5 and the peak attributed to (200) plane of nitride 6, and the peak intensities $I_C$ and $I_N$ described above satisfy relationship of $I_{CN}<0.3\ I_C$ and $I_{CN}<0.3\ I_N$. In other words, it is desirable that the peak of the carbonitride 7 is hardly detectable. This enables it to suppress the bonding force between the cBN particles 2 from decreasing and surely prevent the cBN particles 2 from coming off.

It is also preferable to control the ratio ($I_{IL}/I_{cBN}$) of the intensity $I_{IL}$ of a diffraction peak attributed to (101) plane of the intermediate phase 4 to intensity $I_{cBN}$ of a diffraction peak attributed to (111) plane of the cBN particles 2 in a range from 0.1 to 0.8, more preferably from 0.4 to 0.7 as measured by X-ray diffraction analysis. This enables it to hold the cBN particles 2 more firmly and achieve well-balanced proportions of the contents of the cBN particles 2 and the binder phase 3 that ensure high hardness and high toughness.

Third Embodiment

A third embodiment of the cBN sintered material according to the present invention will now be described. In this embodiment, components that are identical with or similar to those of the first and second embodiments will be denoted with the same reference numeral and description thereof will be omitted.

In the cBN sintered material of this embodiment, the nitride 6 and the carbide 5 coexist in the binder phase 3 shown in FIG. 1(a). Mean particle size $d_C$, calculated by averaging the diameters of equivalent circles corresponding to areas of individual grains of carbide 5 located between the cBN particles 2, measured by observing the cross section of the cBN sintered material, and mean particle size $d_N$, calculated by averaging the diameters of equivalent circles corresponding to areas of individual grains of nitride 6 are such that the ratio ($d_N/d_C$) is in a range from 0.4 to 1.2. This constitution enables it to prevent the cBN particles 2 from coming off more effectively, that has been impossible with the binder phase constituted from a carbide, a nitride or a carbonitride that is a solid solution thereof. As a result, it is made possible to suppress the cBN particles from coming off and the binder phase 3 from wearing and coming off at the same time, thus providing the cBN sintered material having high wear resistance and greatly improved chipping resistance.

The mean particle size in this embodiment is determined as follows. Locations of the compounds such as nitride 6 and carbide 5 are identified by microscopic observation of the cBN sintered material, mean areas of the nitride 6 and carbide 5 are determined by Luzex method or the like, and the diameter of a circle having the area equal to the mean area becomes the mean particle size of the nitride 6 or the carbide 5. Microscopic observation may be carried out by using a metallurgical microscope, laser microscope, digital microscope, scanning electron microscope, transmission electron microscope or any appropriate microscope depending on the constitution of the cBN sintered material.

It is preferable that the mean particle size $d_{cBN}$ of the cBN particles 2 is 5 μm or smaller, the mean particle size $d_C$ of the carbide 5 is in a range from 1 to 3 μm and the mean particle size $d_N$ of the nitride 6 is in a range from 0.5 to 2 μm. This improves the hardness of the cBN sintered material and makes the bonding between the cBN particles 2 more firmly, thereby improving the wear resistance.

Fourth Embodiment

A fourth embodiment of the cBN sintered material according to the present invention will now be described. In this embodiment, components that are identical with or similar to those of the first to third embodiments will be denoted with the same reference numeral and description thereof will be omitted.

In the cBN sintered material of this embodiment, residual compressive stress $\sigma_{cBN}$ of 300 MPa or more, preferably from 300 to 1000 MPa and more preferably from 500 to 700 MPa remains on the cBN particles 2 shown in FIG. 1(a). This enables it to prevent the cBN particles 2 from coming off more effectively, improve wear resistance and greatly improve chipping resistance.

It is preferable that residual compressive stress remains in both the cBN particles 2 and the binder phase 3, and a ratio ($\sigma_{cBN}/\sigma_b$) of the residual compressive stress $\sigma_{cBN}$ remaining in the cBN particles 2 and the residual compressive stress $\sigma_b$ remaining in the binder phase 3 is in a range from 2 to 5, more preferably 2 to 3. This enables it to prevent the cBN particles 2 from coming off more effectively and increase the strength of the cBN sintered material. Wear resistance can also be improved when ratio ($\sigma_{cBN}/\sigma_b$) is from 2 to 3.

Residual compressive stress can be determined by, for example, X-ray residual stress measuring method ($2\theta-\sin^2\phi$) through X-ray diffraction analysis (XRD) of the sintered material 1. In case the cBN sintered material 1 contains two or more kinds of material such as carbide 5 and nitride 6 as the binder phase 3, residual stress in the binder phase 3 is determined by taking into consideration the proportions of the contents of carbide 5 and nitride 6. Specifically, residual stress is determined for each material. Proportions of the contents of these materials are also calculated by assuming that the maximum peak intensity of X-ray diffraction analysis is proportional to the content. Then the residual stress of each material multiplied by the proportion of its content (the ratio of the amount of the material to the total amount of the binder phase) is added for all materials, thus giving the residual stress of the binder phase 3.

Residual compressive stress $\sigma_b$ remaining in the binder phase 3 is preferably in a range from 60 to 300 MPa, more preferably from 100 to 300 MPa. This enables it to prevent the cBN particles 2 from coming off while improving the wear resistance and greatly improving the chipping resistance.

Ratio ($\sigma_C/\sigma_N$) of the residual compressive stress $\sigma_C$ acting on the carbide 5 to the residual compressive stress $\sigma_N$ acting on the nitride 6 in the binder phase 3 is preferably in a range from 1.5 to 5. This enables it to optimize the residual stress of the cBN sintered material 1 and improve wear resistance and chipping resistance of the cBN sintered material 1.

It is also preferable that the residual compressive stress $\sigma_N$ acting on the nitride 6 is in a range from 30 to 200 MPa and the residual compressive stress ac acting on the carbide 5 is in a range from 100 to 700 MPa, and that the value of ratio ($\sigma_C/\sigma_N$) is within the range described above.

Fifth Embodiment

A fifth embodiment of the cBN sintered material according to the present invention will now be described. In this embodiment, components that are identical with or similar to those of the first to fourth embodiments will be denoted with the same reference numeral and description thereof will be omitted.

FIG. 3 is a schematic sectional view showing the cBN sintered material of this embodiment. As shown in FIG. 3, the cBN sintered material A of this embodiment is the cBN sintered material 1 that is coated with a particular hard film 40 formed on the surface thereof. In other words, the cBN sintered material A has such a constitution as the cBN sintered material 1 comprising the cBN particles 2 and binder phase 3 that contains carbide 5 and the nitride 6 is coated with the particular hard film 40 described above.

In this constitution, coexistence of the carbide 5, and the nitride 6 in the binder phase 3 has such an effect that residual compressive stress remains in the cBN sintered material 1 upon completion of sintering due to differences in the thermal expansion and in shrinkage between the carbide 5 and the nitride 6, so as to improve the strength of the cBN sintered material 1. In the cBN sintered material A of this embodiment, since the cBN sintered material 1 is coated with the particular hard film 40 on the surface thereof, the cBN sintered material 1 is further subjected to the residual stress so that a high residual compressive stress can be generated near the interface between the hard film 40 and the cBN sintered material 1, due to the synergy effect of the residual compressive stresses of carbide 5 and nitride 6. As a result, residual stress on the surface of the hard film 40 can be reduced, so that the cBN sintered material A can have very high toughness. Moreover, since the hard film 40 has high hardness, wear resistance can be improved further. Also because the hard film 40 is excellent in hardness at high temperatures, in oxidation resistance and in lubricating property, it demonstrates excellent wear resistance and chipping resistance under harsh conditions where cutting tools and anti-wear materials are used.

The hard film 40 is constituted from at least one layer of hard material made of carbide, nitride, boride, oxide and carbonitride of at least one metal element selected from among the metals of groups 4, 5 and 6 of the periodic table, Al and Si and solid solution thereof, hard carbon and boron nitride. FIG. 3 shows a case where the hard film 40 consists of two layers.

Preferable examples of the hard film 40 include a single-layer film selected from among a group consisting of a film made of a compound of Ti, $Al_2O_3$ film, polycrystalline diamond film, diamond-like carbon (DLC) film, cubic boron nitride (cBN) film, or a film consisting of two or more layers.

The hard film 40 may be formed by a thin film forming method such as thermal CVD, plasma CVD or other chemical vapor deposition method, ion plating, arc ion plating, sputtering, vapor deposition or other physical vapor deposition method (PVD) or plating method, to a predetermined thickness over a particular region including a cutting edge or over the entire surface of the cBN sintered material 1. Specifically, in case a (Ti, Al)N hard film is formed by arc ion plating method, titanium-aluminum (TiAl) alloy is used as a target to vaporize and ionize a metal source by arc discharge, so that the metal ion reacts with the nitrogen ($N_2$) gas used as a nitrogen source to form a film. It is preferable to form the film while applying a bias voltage of 30 to 300 V in order to increase the density and bonding with the substrate of the film. Conditions of the X-ray diffraction peaks of the hard film can be controlled with predetermined range described later, by varying the kind of gas and gas pressure when forming the film.

The hard film 40 is preferably formed by physical vapor deposition (PVD) method. This makes it possible to improve the bonding strength of the film with the cBN sintered material 1 and optimize the residual stress existing on the surface of the cBN sintered material A, thereby improving the wear resistance and chipping resistance of the cBN sintered material A.

Total thickness of the hard film 40 is preferably in a range from 0.01 to 15 μm, more preferably from 0.1 to 10 μm. This increases the bonding strength of the hard film 40 with the cBN sintered material 1 and makes it less likely to peel off, thereby to suppress the film from peeling off while maintaining wear resistance. More specifically, there exists an optimum film thickness for each of different materials that form the hard film. For example, a hard film of ultra-high hardness such as DLC film or cBN film is preferably a single layer having thickness of 0.01 to 0.3 μm. A hard film made of a compound of Ti to be described later is preferably a single layer having thickness of 0.5 to 8 μm. Proper residual stress of the hard film 40 is obtained with a thickness in the range described above.

Residual compressive stress existing in the hard film 40 is preferably in a range from 0.1 to 30 GPa. This increases the bonding strength of the hard film 40 with the cBN sintered material 1 and optimizes the residual stress existing on the surface of the cBN sintered material A, thereby to increase the strength of the cBN sintered material A.

Residual compressive stress in the cBN sintered material A coated with the hard film 40 is preferably 200 MPa or higher, more preferably in a range from 300 to 1000 MPa and most preferably 500 to 1000 MPa. This increases the bonding strength of the hard film 40 and optimizes the residual stress existing on the surface of the cBN sintered material A, thereby to increase the strength of the cBN sintered material A.

It is preferable that at least one layer of the hard film 40 is made of a compound represented by the following general formula (1). This increases the hardness and toughness of the hard film 40 and bonding strength thereof with the cBN sintered material 1.

[Chemical Formula 1]

  (1)

wherein M represents at least one kind of metal element selected from among elements, except for Ti, of groups 4, 5 and 6 of the periodic table, Al and Si. $0<a\leq1$, $0\leq x\leq1$, $0\leq y\leq1$ and $0\leq z\leq1$.)

Moreover, it is preferable that at least one layer of the hard film 40 is made of a compound represented by the following general formula (2). This makes it possible to improve the characteristics such as hardness and strength of the hard film 40, and make the cBN sintered material A of higher toughness and higher hardness.

[Chemical Formula 2]

  (2)

wherein M represents at least one kind of metal element selected from among elements, except for Ti, of groups 4, 5 and 6 of the periodic table, Al and Si. $0.3\leq a\leq0.7$, $0\leq x\leq0.5$, $0\leq y\leq0.5$, $0.5\leq z\leq1$ and $x+z+y+z\leq1$.)

At least one layer of the hard film 40 preferably show a value of 0.7 or higher for the ratio $I_{(111)}/I_{(200)}$ of the intensity $I_{(111)}$ of a diffraction peak attributed to (111) plane to intensity $I_{(200)}$ of a diffraction peak attributed to (200) plane in X-ray diffraction analysis. This makes the grain sizes of the crystal of the compound that constitutes the hard film 40 smaller so that hardness of the hard film 40 becomes higher, thereby to improve wear resistance. As the grains of the hard film 40 are smaller, grain defects of the hard film 40 decreases and the bonding strength between the hard film 40 and the cBN sintered material 1 increases, so that the film is suppressed from peeling off with chipping resistance and thermal shock resistance being greatly improved.

In order to increase the bonding strength between the hard film 40 and the cBN sintered material 1, such an intermediate layer (not shown) may be provided between the hard film 40 and the cBN sintered material 1 that is made of a metal such as titanium, or a nitride, carbide or carbonitride of at least one metal element selected from among groups 4, 5 and 6 of the periodic table, B, Al and Si.

Before forming the hard film 40, surface of the cBN sintered material 1 may be processed by shot peening, grit blast, electrolytic etching, chemical etching, mechanical grinding, polishing, ion implantation or other method. Bonding strength of the hard film 40 can also be increased by such a surface treatment.

A cBN sintered material of fiber-like structure that is another cBN sintered material 1 according to the first to fifth embodiments will now be described in detail with reference to the accompanying drawing, while taking the first embodiment as an example. FIG. 4(*a*) is a schematic sectional view showing other cBN sintered material of this embodiment, and FIG. 4(*b*) is a perspective view thereof. As shown in FIGS. 4(*a*), 4(*b*), cBN sintered material 10 has such a single-filament fiber-like structure that a shell member 9 made of particular cBN sintered material covers the circumferential surface of a fiber-like core member 8 made of particular cBN sintered material.

The single-filament fiber-like structure can be made in either of the following two forms. A first cBN sintered material 10*a* has such a single-filament fiber-like structure that a skin member 9*a*, which is made of cBN sintered material constituted from cBN particles 2 that are bound by a binder phase that is made of nitride 6 of at least one kind of metal element selected from among a group consisting of metals of groups 4, 5 and 6 of the periodic table, covers the circumferential surface of a fiber-like core member 8*a* made of cBN sintered material constituted from cBN particles that are bound by a binder phase made of carbide 5 of at least one kind of metal element selected from among metals of groups 4, 5 and 6 of the periodic table.

A second cBN sintered material 10*b* has such a single-filament fiber-like structure that a shell member 9*b* made of cBN sintered material constituted from cBN particles 2 that are bound by a binder phase made of carbide 5 of at least one kind of metal element selected from among metals of groups 4, 5 and 6 of the periodic table covers the circumferential surface of a fiber-like core member 8b made of cBN sintered material constituted from cBN particles that are bound by binder phase made of nitride 6 of at least one kind of metal element selected from among metals of groups 4, 5 and 6 of the periodic table.

Even when the cBN sintered material has the single-filament fiber-like structure described above, the cBN sintered material 10 as a whole has such a constitution that carbide 5 and nitride 6 coexist in the binder phase 3, and therefore similar effects to those of the cBN sintered material 1 described previously can be achieved. Moreover, when the cBN sintered material has the single-filament fiber-like structure and one of the binder phases of the core member and the shell member is made from carbide 5 and the other from nitride 6, properties of the core member 8 and the shell member 9 can be put into action in a well-balanced manner, thus causing the cBN sintered material as a whole to exhibit the best performance. As a result, wear resistance and chipping resistance of the cBN sintered material are improved more effectively. It is also made possible to preferentially improve either wear resistance or chipping resistance by controlling the direction of fiber.

The cBN sintered material of fiber-like structure may be, besides the single-filament fiber-like structure described above, a cBN sintered material 11 having multi-filament fiber-like structure wherein a plurality of cBN sintered materials 10 having single-filament fiber-like structure are bundled as shown in FIG. 5(a), 5(b). This constitution improves the wear resistance and chipping resistance further.

When bundling the cBN sintered materials 10 having single-filament fiber-like structure, only the first cBN sintered materials 10a may be bundled, or only the second cBN sintered materials 10b may be bundled, or the first cBN sintered material 10a and the second cBN sintered material 10b may be bundled together, depending on the application.

Dimensions of the cBN sintered materials of fiber-like structure 10, 11 are preferably such that mean diameter $d_C$ of the core member 8 shown in FIG. 4(a) is in a range from 10 to 200 µm and thickness $d_S$ of the shell member 9 is in a range from 1 to 20 µm, in order to improve the chipping resistance of the cutting tool that would be made thereof. Mean diameter $d_C$ of the core member 8 and thickness of the shell member 9 may be determined by observing the cross section of the cBN sintered material of fiber-like structure 10, 11 under a scanning electron microscope (SEM) or a metallurgical microscope.

The multi-filament fiber-like structure may be, besides the bundled form shown in FIGS. 5(a), 5(b), constituted as shown in FIGS. 6(a) to 6(d). FIG. 6(a) shows a cBN sintered material 16A wherein the cBN sintered materials of fiber-like structure 10 (or 11) are arranged in sheet configuration, FIG. 6(b) shows a cBN sintered material 16B wherein a plurality of the sheet-like cBN sintered materials 16A are stacked in the same direction, FIG. 6(c) shows a cBN sintered material 16C wherein a plurality of the sheet-like cBN sintered materials 16A are stacked in different directions, and FIG. 6(d) shows a cBN sintered material 16D wherein the cBN sintered materials of fiber-like structure 10 (or 11) are arranged in the direction perpendicular to the sheet surface. Such a constitution may also be employed as the cBN sintered materials of fiber-like structure 10 (or 11) are arranged at random.

The second embodiment described previously is a case where the cBN sintered material 1 of which binder phase 3 contains carbide 5 and nitride 6 coexisting therein shows the diffraction peak of the nitride 6 and the diffraction peak of the carbide 5 at the same time in the X-ray diffraction analysis. However the present invention is not limited to such a case, and the cBN sintered material of single-filament fiber-like structure 10, 11 may also show the diffraction peak of the nitride 6 and the diffraction peak of the carbide 5 at the same time in the X-ray diffraction analysis.

In case a cBN sintered material for cutting tool 30 to be described later is made of the cBN sintered material of the second embodiment, in particular, the ratio $(I_C/I_N)$ of the intensity $I_C$ of a diffraction peak attributed to plane (200) of carbide 5 to intensity $I_N$ of a diffraction peak attributed to (200) plane of the nitride 6 is controlled within a range from 0.2 to 1.2, preferably from 0.3 to 0.9 as measured by X-ray diffraction analysis of the cross section of the fiber structure of the cBN sintered material of fiber-like structure 10, 11 described above, too. This enables it to prevent the cBN particles 2 from coming off and prevent excessive wear from occurring, without allowing the wear resistance to decrease during cutting operation.

It is preferable that the conditions described above are satisfied also with regards to the ratio $I_N/I_{cBN}$, ratio $I_C/I_{cBN}$, peak intensity $I_{CN}$, peak intensity $I_C$ and peak intensity $I_N$ of the second embodiment.

The third embodiment dealt with a case where the ratio $(d_N/d_C)$ has a predetermined value in the cBN sintered material 1 wherein the binder phase 3 contains carbide 5 and nitride 6 coexisting therein. However, the present invention is not limited to this constitution, and it is preferable that the ratio $(d_N/d_C)$ has a predetermined value also in the cBN sintered material 10, 11 having single-filament fiber-like structure.

In case the cBN sintered material for cutting tool 30 to be described later is made of the cBN sintered material of the third embodiment, the cBN sintered material of fiber-like structure also has the binder phase 3 that contains nitride 6 and carbide 5 coexisting therein when the cBN sintered material is considered as a whole, and the nitride 6 and the carbide 5 are characterized in that the ratio $(d_N/d_C)$ of mean grain size $d_N$ of the nitride 6 to mean grain size $d_C$ of the carbide 5 is in a range from 0.4 to 1.2. It is also preferable that mean particle size $d_{cBN}$ of the cBN particles 2 is 5 µm or smaller, mean grain size $d_C$ of the carbide 5 is from 1 to 3 µm and mean grain size $d_N$ of the nitride 6 is from 0.5 to 2 µm. This enables it to prevent the cBN particles 2 from coming off, which is impossible with the conventional binder phase. As a result, it is made possible to prevent the cBN particles from coming off and the binder phase from wearing and coming off at the same time, thus providing the cBN sintered material having high wear resistance and, especially, excellent chipping resistance.

In the cBN sintered material of fiber-like structure 10, 11, too, it is preferable that 300 MPa or higher residual compressive stress $\sigma_{cBN}$ remains in the cBN particles 2. This enables it to suppress the cBN particles 2 from coming off. In the case of the cBN sintered material of fiber-like structure 10, 11, both the residual compressive stress $\sigma_{cBN}$ of the cBN particles 2 and residual compressive stress $\sigma_b$ of the binder phase 3 tend to be higher than in the case of the conventional uniform ceramic structure described previously.

The fifth embodiment dealt with a case where the cBN sintered material 1 wherein the binder phase 3 contains carbide 5 and nitride 6 coexisting therein is covered by the hard film 40 on the surface thereof. However, the present invention is not limited to this constitution, and the hard film 40 may also cover the surface of the shell member 9 of the cBN sintered material 10, 11 having the single-filament and multi-filament fiber-like structure.

An example of method for manufacturing the cBN sintered material of fiber-like structure, that is another cBN sintered material of this embodiment will now be described in detail with reference to the accompanying drawing. FIGS. 7(a) and 7(b) are schematic diagrams showing a method of manufacturing a composite green compact made of the cBN sintered material having single-filament fiber-like structure.

First, a stock material for core member is prepared by crushing and mixing the materials similarly to the process of the method of manufacturing the cBN sintered material described above, except for adding only one of the carbide and nitride as the binder phase component. Then an organic binder is added to the stock material for core member and mixed. The mixture is formed in a cylindrical shape by press molding, extrusion molding, casting or the like, thereby to make a green compact of core member 17 shown in FIG. 7(a).

For the organic binder, for example, paraffin wax, polystyrene, polyethylene, ethylene-ethyl acryl ate, ethylene-vinyl acetate, polybutyl-methacrylate, polyethylene glycol or dibutylphthalate may be used.

Then a stock material for shell member is prepared similarly to the process of the method described above, except for adding one of the carbide and nitride, one other than that used in the stock material for core member as the binder phase component. Then the binder described above is added to the stock material for shell member and mixed. Two green compact of shell members 18 having semi-cylindrical shape shown in FIG. 7(a) are formed from the mixture by the forming method described above. The green compact of shell member 18 are disposed around the green compact of core member 17 so as to surround the circumference thereof, thereby to make the composite green compact 19.

Then the composite green compact 19 is formed by simultaneous extrusion (co-extrusion) molding as shown in FIG. 7(b). That is, the green compact of core member 17 and the green compact of shell member 18 are extrusion molded at the same time. This process makes a composite green compact 20 having the single-filament fiber-like structure extended with a small diameter, wherein the green compact of shell members 18 are disposed on the green compact of core member 17 so as to cover the circumference thereof.

The green compact 21 having multi-filament fiber-like structure may be formed by bundling a plurality of composite green compacts 20 of single-filament fiber-like structure that have been subjected to the simultaneous extrusion molding, and applying simultaneous extrusion molding again to the bundle. With this method, it is made possible to further increase the bonding strength between the composite materials in the green compact 20.

In the simultaneous extrusion molding process, cross section of the fiber-like green compacts that are extended as described above can be made in a desired shape including circle, triangle, rectangle and hexagon, by changing the extrusion die.

In order to form the composite structure constituted from the composite materials shown in FIG. 6 arranged in a sheet-like configuration, the composite green compacts 20 made as described above are arranged to form the sheet-like green compact 22. The composite green compacts 20 in the sheet-like green compact 22 may be stacked in parallel to each other, or in such a manner as to cross each other at an angle of 90° or 45°. In this case, the sheet-like green compact 22 may also be pressurized by cold isostatic pressing (CIP) or the like, with a bonding material such as the adhesion described above between the composite green compacts 20, as required. Alternatively, the sheet-like green compact 22 may also be formed by rolling by means of a pair of rolls 23 as shown in FIG. 9.

The sheet-like green compact 22 may also be made by employing a forming method such as the known rapid prototyping method when disposing the composite materials (cBN sintered materials 16A to 16D shown in FIG. 6). The green compact 21 may also be used instead of the composite green compact 20.

Then the green compacts 20 to 22 made as described above are heated at a temperature from 600 to 1000° C. for a period of 1 to 72 hours in vacuum of 2 Pa or lower pressure, to carry out degreasing heat treatment. The green compact thus treated is charged, together with a backing member made of cemented carbide prepared separately, in an ultra-high pressure firing apparatus, and is fired under the conditions described previously so as to obtain the cBN sintered material of fiber-like structure.

The firing may also be carried out by charging the green compact thus degreased, together with the backing member made of cemented carbide prepared separately, in the ultra-high pressure sintering apparatus, and sintering it in the state of being bonded with the backing member made of cemented carbide in an integral body. The sintered body is ground or polished to a predetermined thickness by means of diamond wheel, electrolytic polishing, brushing or the like.

When a cutting tool is made of the cBN sintered material, a cutting edge of high strength and sharper cutting may be formed by applying C face treatment or R face treatment to the edge of the sintered material by means of an elastic grinding stone, brush or the like.

<Cutting Tool>

A cutting tool according to the present invention will now be described, that is provided with the cBN sintered material of the embodiments described above, with reference to the accompanying drawings. FIG. 10 is a perspective view showing an embodiment of the cutting tool according to the present invention. As shown in FIG. 10, the tool tip 12 has such a structure as a cBN sintered material for cutting tool 30 cut into a predetermined shape is brazed via a backing member 15 onto a tip mounting seat provided at a corner of a tool insert 13. The cBN sintered material for cutting tool 30 has cutting edges 14 formed along the edges where the top surface and the side faces meet.

FIG. 11 is a schematic sectional view showing the constitution of the corner of the tool tip 12 that employs the cBN sintered material of fiber-like structure described above. FIG. 11(a) is a schematic sectional view showing an example and FIG. 11(b) is a schematic sectional view showing another example. In the tool tip 12 shown in FIG. 11(a), the cBN sintered material for cutting tool 30 is constituted from a sheet-like cBN sintered material 16C, where the cBN sintered material of fiber-like structure 10 (or 11) is disposed so that the direction of fibers are disposed in parallel to the rake face 31 (cross sections of the fibers are exposed on the flank 32).

In the tool tip 12 shown in FIG. 11(b), the cBN sintered material for cutting tool 30 is constituted from a cBN sintered material 16D, where the cBN sintered material of fiber-like structure 10 (or 11) is disposed so that the direction of fibers are disposed in parallel to the flank 32 (cross sections of the fibers are exposed on the rake face 31).

In addition to the constitution described above, such constitutions as the fiber of the cBN sintered material of fiber-like structure 10 (or 11) is directed at a predetermined angle from the rake face 31, or the fibers of the cBN sintered material of fiber-like structure 10 (or 11) are disposed in random directions. Among these constitutions, the constitution shown in FIG. 11(b) is desirable in order to improve chipping resistance. The tool tip 12 may be made by advantageously using the simple cBN sintered material 1 described above, besides the cBN sintered material of fiber-like structure 10 (or 11).

The cBN sintered material exhibits excellent wear resistance and chipping resistance, and can be preferably used as a structural material that is required to have wear resistance and chipping resistance such as drill bits of excavating tool and anti-wear material for die or sliding member. The cBN sintered material can be used for a cutting tool with a long service life, to exhibit excellent performance in metal cutting operations with a cutting edge, that is formed along a ridge where a flank and a rake face thereof meet, being pressed against a workpiece to be cut, particularly a metal such as iron or aluminum, or heat resistance alloy. The cBN sintered material exhibits excellent cutting performance in machining of hard-to-cut metals such as hardened steel.

When used in a cutting tool, the cutting tool preferably has such a constitution that comprises a tool insert and a tool tip brazed at the mounting seat of the tool insert, where the tool tip is made of the cBN sintered material of this embodiment. In this case, while the residual stress remaining in the cBN sintered material tends to be temporarily released when brazing the tool tip, the residual stress remaining in the cBN sintered material of the tool tip is controlled within a proper range so as to achieve high wear resistance and high chipping resistance.

The present invention will be described in detail by way of examples, but it is understood that the present invention is not limited by the following examples.

Example I

A cBN material powder having a mean particle size of 2 µm, TiC material powder having a mean particle size of 1 µm, TiN material powder having a mean particle size of 1 µm, TiCN material powder having a mean particle size of 1 µm, HfC material powder having a mean particle size of 1 µm, NbC material powder having a mean particle size of 1 µm, metal Al powder having a mean particle size of 1.2 µm and metal Co powder having a mean particle size of 0.8 µm were prepared in proportions shown in Table 1, and were mixed in a ball mill using alumina balls for 16 hours.

Then the mixed powder was press formed under a pressure of 98 MPa. This green compact was fired under the conditions shown in Table 1 in an ultra-high pressure, high temperature apparatus, namely heated at the temperature raising rate shown in Table 1, held under pressure of 5.0 GPa at the firing temperature shown in Table 1 for the period therein, and then cooled down at the temperature lowering rate shown in Table 1, thereby to obtain the cBN sintered material (samples Nos. I-1 to I-10 shown in Table 1).

(Content)

The samples of the cBN sintered material obtained in the process described above were ground and polished to mirror finish, and the structures thereof were observed under a metallurgical microscope. The cBN particles appearing in black, nitride appearing in brown and carbide appearing in white were clearly distinguished, while the intermediate phase and the carbonitride were also distinguished through EPMA (electron probe microanalysis) using a WDS (wavelength-dispersion type X-ray spectrometer). Areas of 20 or more grains of each compound were measured by image analysis, and mean values of the areas were taken to represent the contents of the cBN particles, carbide, nitride, the intermediate phase and the carbonitride. The results are shown in Table 1. Presence of carbonitride was determined by observing the peak in X-ray diffraction analysis. When the corresponding peak was observed, proportion of the content of that component was determined by comparing with the standard sample (green compact made of a mixture of cBN particles and carbonitride powder).

TABLE 1

| Sample No.[1] | Proportion (% by volume) | | | | | Firing condition | | | |
|---|---|---|---|---|---|---|---|---|---|
| | | | | | | Temperature raising rate | Firing temperature | Firing period | Temperature lowering rate |
| | cBN | Carbide | Nitride | Metal | Others | (° C./min.) | (° C.) | (minute) | (° C./min.) |
| I-1 | the rest | TiC: 15 | TiN: 25 | Al: 10 | — | 50 | 1400 | 15 | 50 |
| I-2 | the rest | TiC: 10 WC: 5 | TiN: 15 | Al: 5 Co: 3 | — | 50 | 1400 | 15 | 50 |
| I-3 | the rest | HfC: 20 | TiN: 10 | Al: 10 | — | 50 | 1400 | 15 | 50 |
| I-4 | the rest | TiC: 3 | TiN: 8 | Al: 10 Co: 5 | — | 50 | 1400 | 15 | 50 |
| * I-5 | the rest | TiC: 45 | — | Al: 15 | — | 50 | 1400 | 15 | 50 |
| * I-6 | the rest | — | TiN: 35 | Al: 15 | — | 50 | 1400 | 15 | 50 |
| * I-7 | the rest | — | — | Al: 8 | TiCN: 37 | 50 | 1400 | 15 | 50 |
| * I-8 | the rest | TiC: 21 NbC: 10 | TiN: 3 | Al: 3 Co: 3 | — | 50 | 1400 | 15 | 50 |
| * I-9 | the rest | TiC: 25 | TiN: 15 | Al: 15 | — | 50 | 1500 | 15 | 50 |
| * I-10 | the rest | TiC: 15 | TiN: 15 | Al: 10 | — | 20 | 1400 | 30 | 20 |

| | Content proportion in sintered material[2] | | | | | |
|---|---|---|---|---|---|---|
| Sample No.[1] | cBN | Carbide | Nitride | Intermediate phase | Carbonitride | $p_C/p_N$ |
| I-1 | 47 | 13 | 22 | 16 | 2 | 0.6 |
| I-2 | 58 | 15 | 13 | 13 | 1 | 1.2 |
| I-3 | 56 | 16 | 7 | 21 | — | 2.3 |
| I-4 | 78 | 3 | 7 | 12 | — | 0.4 |
| * I-5 | 42 | 43 | — | 15 | — | — |
| * I-6 | 50 | — | 32 | 18 | — | — |
| * I-7 | 54 | — | — | 11 | 35 | — |
| * I-8 | 58 | 30 | — | 4 | 8 | — |

TABLE 1-continued

| | | | | | | |
|---|---|---|---|---|---|---|
| * I-9 | 53 | 8 | — | 10 | 27 | — |
| * I-10 | 67 | — | — | 8 | 25 | — |

[1] Samples marked '*' are out of the scope of the present invention.
[2] Content proportion: cBN particles, carbide and nitride were observed under a metallurgical microscope (% by area). The content of carbonitride was calculated from XRD peak.

The samples of the cBN sintered material were cut to predetermined dimensions by wire discharge cutting or the like, each being brazed onto a mounting seat of a cemented carbide substrate, thereby to make throwaway cutting tool having the configuration specified in JIS CNGA120408, that was subjected to continuous cutting test and interrupted cutting test under the following conditions. The results are shown in Table 2.
(Continuous Cutting Test)
Mode of cutting: Turning
Workpiece: SCM415H carburizing-hardened steel (HRC58-62) having cylindrical shape 70 mm in diameter
Cutting speed: 200 m/min.
Infeed: 0.2 mm
Feed rate: 0.1 mm/rev.
Cutting time: 20 minutes
Measurement: Amount of wear at the distal end
(Interrupted Cutting Test)
Mode of cutting: Turning
Workpiece: SCM415H carburizing-hardened steel (HRC58-62) having lotus root shape with 8 holes
Cutting speed: 150 m/min.
Infeed: 0.2 mm
Feed rate: 0.2 mm/rev.
Measurement: Number of impacts before chipping (Upper limit 40000)

TABLE 2

| Sample No.[1] | Continuous cutting test Amount of wear(mm) | Interrupted cutting test Number of impacts |
|---|---|---|
| I-1 | 0.12 | 40000 |
| I-2 | 0.14 | 36000 |
| I-3 | 0.18 | 35000 |
| I-4 | 0.16 | 32000 |
| * I-5 | 0.25 | 10000 |
| * I-6 | 0.24 | 16000 |
| * I-7 | 0.20 | 13000 |
| * I-8 | 0.16 | 8000 |
| * I-9 | 0.18 | 13500 |
| * I-10 | 0.19 | 12000 |

[1] Samples marked '*' are out of the scope of the present invention.

The results shown in Tables 1 and 2 show that samples Nos. I-5, 8 and 9 that contained only carbide (TiC) in the sintered material had unsatisfactory chipping resistance because of insufficient bonding between the cBN particles. Sample No. I-6 that contained only nitride (TiN) in the sintered material had unsatisfactory wear resistance, and performed with short service life. Samples Nos. I-7 and 10 where the binder phase was constituted from only carbonitride (TiCN) showed unsatisfactory performance in wear resistance and in chipping resistance.

Cutting tools made of the cBN sintered material (samples Nos. I-1 to 4) of the present invention, in contrast, all exhibited sufficient wear resistance with amount of wear 0.20 mm or less in continuous machining of carburizing-hardened steel that is hard to cut. In interrupted machining, these samples endured 30000 or more impacts before chipping. Samples Nos. I-1 and 4, in particular, showed excellent chipping resistance with no chipping after 40000 impacts, and demonstrated stable cutting performance over an extended period of time.

Example II

The green compact of core member was made by extrusion molding of a material that was prepared by mixing 45% by volume of cBN, 42% by volume of TiN and 15% by volume of Al and adding an organic binder thereto. The green compact of skin member was made by extrusion molding of a material that was prepared by mixing 55% by volume of cBN, 35% by volume of TiC and 10% by volume of Al and adding an organic binder thereto.

The green compact of core member and the green compact of shell member made as described above were extrusion molded as shown in FIG. 7, thereby to make a composite green compact. The composite green compacts were bundled together to make a composite green compact of multi-filament structure in a manner shown in FIG. 8. The composite green compacts of multi-filament structure were further arranged in sheet configuration, and the sheets were stacked and pressed. The stack was fired by raising the temperature at a rate of 50° C. per minute, holding it under pressure of 5.0 GPa at a temperature of 1400° C. for 15 minutes, then lowering the temperature at a rate of 50° C. per minute in an ultra-high pressure, high temperature apparatus, thereby to obtain the composite cBN sintered material.

The samples of the composite cBN sintered material obtained in the process described above were ground and polished to mirror finish, and the structures thereof were observed under a metallurgical microscope. The cBN particles appearing in black, nitride (TiN) appearing in brown and carbide (TiC) appearing in white were clearly distinguished, while carbonitride (TiCN) could also be distinguished. Proportions of the areas occupied by various components measured by image analysis were 50% for cBN, 10% for TiC, 25% for TiN and 2% for TiCN.

The samples of the cBN sintered material were cut to predetermined dimensions by wire discharge cutting, each being brazed onto a mounting seat of a cemented carbide substrate, thereby to make a throwaway cutting tool having the configuration specified in JIS CNGA120408, that was subjected to cutting tests similarly to Example I. The samples experienced the amount of wear as small as 0.15 mm after cutting for 20 minutes, showed no chipping after being subjected to 40000 impacts in interrupted machining test, thus exhibiting excellent cutting performance.

Example III cBN material powder having a mean particle size of 2 μm, TiC material powder having a mean particle size of 1 μm, TiN material powder having a mean particle size of 1 μm, TiCN material powder having a mean particle size of 1 μm, HfC material powder having a mean particle size of 1 μm, TaC material powder having a mean particle size of 1 μm, metal Al powder having a mean particle size of 1.2 μm and metal Co powder having a mean particle size of 0.8 μm were prepared in proportions shown in Table 3, and were mixed in a ball mill using alumina balls for 16 hours, and the mixed powder was press formed under a pressure of 98 MPa.

This green compact was fired similarly to Example I except for employing the firing conditions shown in Table 3, instead of the conditions shown in Table 1 in an ultra-high pressure, high temperature apparatus, thereby to obtain the cBN sintered material (samples Nos. III-1 to 10 shown in Table 3).

bonding between the cBN particles. Sample No. III-6, from which only the peak of nitride was observed, was insufficient in wear resistance which resulted in a short tool life. Sample No. III-7 made by using TiCN powder for the binder phase and sample No. III-8 where the binder phase turned into TiCN phase by firing were insufficient in both wear resistance and chipping resistance. Sample No. III-9 where the binder phase consisted of TiCN phase and TiC phase and sample No. III-10

TABLE 3

| Sample No.[1] | Proportion (% by volume) | | | | Firing condition | | | |
|---|---|---|---|---|---|---|---|---|
| | | | | | Temperature raising rate (° C./min.) | Firing temperature (° C.) | Firing period (minute) | Temperature lowering rate (° C./min.) |
| | cBN | Carbide | Nitride | Metal | Others | | | |
| III-1 | the rest | TiC: 20 | TiN: 30 | Al: 10 | — | 50 | 1400 | 15 | 50 |
| III-2 | the rest | TiC: 13 WC: 5 | TiN: 16 | Al: 5 Co: 3 | — | 30 | 1300 | 30 | 45 |
| III-3 | the rest | HfC: 20 | TiN: 15 | Al: 10 | — | 40 | 1400 | 20 | 30 |
| III-4 | the rest | TaC: 3 | TiN: 14 | Al: 10 Ni: 5 | — | 50 | 1250 | 25 | 50 |
| * III-5 | the rest | TiC: 40 | — | Al: 15 | — | 50 | 1400 | 10 | 100 |
| * III-6 | the rest | — | TiN: 40 | Al: 15 | — | 50 | 1400 | 10 | 100 |
| * III-7 | the rest | — | — | Al: 8 | TiCN: 37 | 50 | 1400 | 10 | 100 |
| * III-8 | the rest | TiC: 15 | TiN: 15 | Al: 15 | — | 50 | 1500 | 15 | 50 |
| * III-9 | the rest | TiC: 20 | TiN: 10 | Al: 15 | — | 50 | 1400 | 30 | 20 |
| * III-10 | the rest | TiC: 10 | TiN: 25 | Al: 8 | — | 100 | 1600 | 10 | 100 |

[1]Samples marked '*' are out of the scope of the present invention.

(Intensities of X-ray Diffraction Peaks)

The samples of cBN sintered material were subjected to X-ray diffraction analysis (XRD) at angle of 2θ=30 to 50° using Cu-Kα line source (with $K_{\alpha 2}$ line removed), peaks of carbide and nitride were identified in the diffraction chart, and the intensity ratio of the carbide and nitride peaks was calculated. The results are shown in Table 4.

(Cutting Test)

The samples of the cBN sintered material were used to make throwaway cutting tool having the configuration specified in JIS CNGA120408, similarly to Example I. Continuous cutting test and interrupted cutting test were conducted similarly to Example I, except for setting the limit for the number of impacts experienced before chipping in the interrupted cutting test to 60000 instead of 40000. The results are shown in Table 4.

where the binder phase consisted of TiCN phase and TiN phase were insufficient in both wear resistance and chipping resistance.

Samples Nos. III-1 to 4 that were tool tips made of sintered material that shows XRD peak of TiC and XRD peak of TiN exhibited sufficient wear resistance with the amount of wear not larger than 0.20 mm in continuous cutting of carburizing-hardened steel, that is a hard-to-cut material. These tool tips exhibited excellent chipping resistance, in particular, in the interrupted cutting test by enduring 30000 impacts or more before chipping and demonstrated stable cutting performance over an extended period of time.

Example IV

The green compact of core member was made similarly to Example II. Then green compact of shell member was made

TABLE 4

| Sample No.[1] | Intensity of XRD analysis peak[2] | | | | | | | Intermediate phase | Continuous cutting test Amount of wear (mm) | Interrupted cutting test Number of impacts |
|---|---|---|---|---|---|---|---|---|---|---|
| | cBN $I_{cBN}$ | Nitride $I_N$ | Carbide $I_C$ | Carbonitride $I_{CN}$ | $I_C/I_N$ | $I_N/I_{cBN}$ | $I_C/I_{cBN}$ | | | |
| III-1 | 100 | 85 | 35 | 2 | 0.41 | 0.85 | 0.35 | TiB$_2$, AlN | 0.13 | 45000 |
| III-2 | 100 | 62 | 50 | 12 | 0.81 | 0.62 | 0.50 | TiB$_2$, WCoB | 0.14 | 39000 |
| III-3 | 100 | 57 | 60 | — | 1.05 | 0.57 | 0.60 | No exist | 0.18 | 38000 |
| III-4 | 100 | 88 | 20 | — | 0.23 | 0.88 | 0.20 | AlN | 0.16 | 33000 |
| * III-5 | 100 | — | 68 | — | — | — | 0.68 | TiB$_2$, AlN | 0.25 | 12000 |
| * III-6 | 100 | 70 | — | — | — | 0.70 | — | No exist | 0.24 | 16000 |
| * III-7 | 100 | — | — | 52 | — | — | — | No exist | 0.20 | 14000 |
| * III-8 | 100 | — | — | 45 | — | — | — | AlN, TiB$_2$ | 0.21 | 12000 |
| * III-9 | 100 | 2 | — | 40 | — | 0.02 | — | AlN | 0.20 | 8000 |
| * III-10 | 100 | — | 5 | 35 | — | — | 0.05 | AlN, TiB$_2$ | 0.26 | 15000 |

[1]Samples marked '*' are out of the scope of the present invention.
[2]The mark '—' in the columns of cBN, Nitride, Carbide and Carbonitride indicates that the peak was not detected.

The results shown in Tables 3 and 4 indicate that sample No. III-5, from which only the peak of carbide was observed, was insufficient in chipping resistance because of insufficient similarly to Example II, except for changing the content of TiC from 35% by volume to 30% by volume. The green compact of core member and the green compact of shell member were used to make the composite green compact of multi-filament structure similarly to Example II, which was fired to make composite cBN sintered material.

X-ray diffraction analysis (XRD) was conducted on the cross section of the composite cBN sintered material, and the peak of carbide in the shell member and the peak of nitride in the core member were identified in the diffraction chart. The ratio ($I_C/I_N$) of the intensity $I_C$ of peak of carbide to intensity $I_N$ of peak of nitride was 0.42. Microscopic observation and composition analysis showed the presence of TiN in the core member and TiC in the shell member.

The sintered material was cut to predetermined dimensions by wire discharge cutting, each being brazed onto a mounting seat of a cemented carbide substrate, thereby to make a throw-away cutting tool having the configuration specified in JIS CNGA120408, that was subjected to cutting tests similarly to Example I. The samples experienced the amount of wear as small as 0.15 mm after cutting for 20 minutes, showed no chipping after being subjected to 60000 impacts in interrupted machining test, thus exhibiting excellent cutting performance.

Example V cBN material powder having a mean particle size of 2.5 μm, TiC material powder having a mean particle size of 1.5 μm, TiN material powder having a mean particle size of 1.2 μm, TiCN material powder having a mean particle size of 1 μm, NbC material powder having a mean particle size of 1 μm, TaC material powder having a mean particle size of 1.1 μm, NbN material powder having a mean particle size of 0.9 μm, metal Al powder having a mean particle size of 1.2 μm and metal Co powder having a mean particle size of 0.8 μm were prepared in proportions shown in Table 5, and were mixed in a ball mill using alumina balls for 16 hours.

The mixed powder was press formed under a pressure of 98 MPa. This green compact was fired similarly to Example I except for employing the firing conditions shown in Table 5, instead of the conditions shown in Table 1 in an ultra-high pressure, high temperature apparatus, thereby to obtain the cBN sintered material (samples Nos. V-1 to 10 shown in Table 5).

(Intensities of X-Ray Diffraction Peaks)

The samples were subjected to X-ray diffraction analysis (XRD), and peaks of carbide, nitride and other components were identified in the diffraction chart, similarly to Example III. The intensity ratio of the peaks shown in Table 6 was calculated.

(Mean Particle Size)

Microstructure was observed in colors by means of a metallurgical microscope, and the states of nitride and carbide existing in the binder phase were checked. Mean particle sizes $d_N$, $d_C$, $d_{cBN}$ were measured by means of Luzex image analyzer. Values of $d_N$, $d_C$, $d_{cBN}$ were determined by using 50 or more grains for each phase shown in the microsctructural photograph.

In case less than 50 grains of a phase could be seen within a single field of view, grains of the phase shown in other field of view were observed and taken into account. A set of measurements for 50 or more grains of each phase was carried out at each of three or more points, with mean values thereof being taken as $d_N$, $d_C$, $d_{cBN}$.

Results of the measurements are summarized in Table 6.

(Cutting Test)

The samples of the cBN sintered material were used to make throwaway cutting tool having the configuration specified in JIS CNGA120408, similarly to Example I. Then continuous cutting test and interrupted cutting test were conducted similarly to Example I, except for setting the limit for the number of impacts experienced before chipping in the interrupted cutting test to 60000 instead of 40000. The results are shown in Table 6.

TABLE 5

| Sample No.[1] | Proportion (% by volume) | | | | | Firing condition | | | | Remarks |
|---|---|---|---|---|---|---|---|---|---|---|
| | | | | | | Temperature raising rate | Firing temperature | Firing period | Temperature lowering rate | |
| | cBN | Carbide | Nitride | Metal | Others | (° C./min.) | (° C.) | (minute) | (° C./min.) | |
| V-1 | the rest | TiC: 25 | TiN: 25 | Al: 12 | — | 50 | 1400 | 15 | 50 | Brazed tip |
| V-2 | the rest | TiC: 12 WC: 8 | TiN: 15 | Al: 6 Co: 4 | — | 30 | 1300 | 30 | 45 | Brazed tip |
| V-3 | the rest | NbC: 15 | NbN: 20 | Al: 10 | — | 40 | 1400 | 20 | 30 | Brazed tip |
| V-4 | the rest | TaC: 10 | TiN: 12 | Al: 15 Ni: 3 | — | 50 | 1250 | 25 | 50 | Brazed tip |
| *V-5 | the rest | TiC: 36 | — | Al: 14 | — | 50 | 1400 | 10 | 100 | Brazed tip |
| *V-6 | the rest | — | TiN: 40 | Al: 10 | — | 50 | 1400 | 10 | 100 | Brazed tip |
| *V-7 | the rest | — | — | Al: 7 | TiCN: 28 | 50 | 1400 | 10 | 100 | Brazed tip |
| *V-8 | the rest | TiC: 15 | TiN: 15 | Al: 10 | — | 50 | 1500 | 15 | 50 | Brazed tip |
| *V-9 | the rest | TiC: 20 | TiN: 10 | Al: 15 | — | 50 | 1400 | 30 | 20 | Brazed tip |
| *V-10 | the rest | TiC: 10 | TiN: 20 | Al: 8 | — | 100 | 1600 | 10 | 100 | Brazed tip |

[1]Samples marked '*' are out of the scope of the present invention.

TABLE 6

| Sample No.[1] | $d_{cBN}$ (μm) | $d_C$ (μm) | $d_N$ (μm) | $d_N/d_C$ | cBN $I_{cBN}$ | Nitride $I_N$ | Carbide $I_C$ | Carbonitride $I_{CN}$ | $I_C/I_N$ | $I_N/I_{cBN}$ | $I_C/I_{cBN}$ | Intermediate phase | Continuous cutting test Amount of wear (mm) | Interrupted cutting test Number of impacts |
|---|---|---|---|---|---|---|---|---|---|---|---|---|---|---|
| V-1 | 2.2 | 1.2 | 0.7 | 0.6 | 100 | 70 | 40 | 2 | 0.57 | 0.70 | 0.40 | TiB$_2$, AlN | 0.15 | 43200 |
| V-2 | 0.8 | 1.0 | 0.4 | 0.4 | 100 | 60 | 45 | 12 | 0.75 | 0.60 | 0.45 | TiB$_2$, WCoB | 0.14 | 38400 |
| V-3 | 2.8 | 1.5 | 1.8 | 1.2 | 100 | 40 | 28 | — | 0.70 | 0.40 | 0.28 | No exist | 0.18 | 31200 |
| V-4 | 3.8 | 3.2 | 2.4 | 0.8 | 100 | 64 | 20 | — | 0.31 | 0.64 | 0.20 | AlN | 0.20 | 36400 |
| *V-5 | 3.8 | 2.4 | — | — | 100 | — | 68 | — | — | — | 0.68 | TiB$_2$, AlN | 0.24 | 11600 |
| *V-6 | 1.2 | — | 0.8 | — | 100 | 70 | — | — | — | 0.70 | — | No exist | 0.28 | 18000 |
| *V-7 | 1.8 | — | — | — | 100 | — | — | 52 | — | — | — | No exist | 0.20 | 14000 |
| *V-8 | 2.0 | — | — | — | 100 | — | — | 45 | — | — | — | AlN, TiB$_2$ | 0.21 | 12000 |
| *V-9 | 2.0 | 1.5 | — | — | 100 | 2 | — | 40 | — | 0.02 | — | AlN | 0.20 | 8800 |
| *V-10 | 2.0 | — | 2.0 | — | 100 | — | 5 | 35 | — | — | 0.05 | AlN, TiB$_2$ | 0.26 | 15600 |

[1] Samples marked '*' are out of the scope of the present invention.

The results shown in Tables 5 and 6 indicate that samples Nos. V-5 to 10, wherein the binder phase does not have coexistence of carbide and nitride, all had weak binding between the cBN particles, and were therefore insufficient in chipping resistance which resulted in a short tool life.

Samples Nos. V-1 to 4, wherein the binder phase contains nitride and carbide coexisting therein, and the ratio $d_N/d_C$ of mean grain size $d_N$ of the nitride to mean grain size $d_C$ of the carbide is in a range from 0.4 to 1.2, in contrast, all showed sufficient wear resistance with the amount of wear not larger than 0.20 mm in continuous cutting of carburizing-hardened steel, that is a hard-to-cut material, and exhibited excellent chipping resistance, in particular, with 30000 impacts or more before chipping in the interrupted cutting test and demonstrated stable cutting performance over an extended period of time.

Example VI

The green compact of core member was made by extrusion molding of a powder material that was prepared by mixing 47% by volume of cBN, 39% by volume of TiN and 14% by volume of Al and adding an organic binder thereto. The green compact of shell member was made by extrusion molding of a material that was prepared by mixing 60% by volume of cBN, 30% by volume of TiC and 10% by volume of Al and adding an organic binder thereto.

The green compact of core member and the green compact of shell member made as described above were used to form composite green compact of multi-filament structure similarly to Example II and were fired thereby to make a composite cBN sintered material.

Image analysis of nitride (TiN) and carbide (TiC) in the cBN sintered material by microscopic observation showed mean grain size $d_C$=1.2 μm for the carbide, mean grain size $d_N$=0.7 μm for the nitride and the ratio $d_N/d_C$=0.6. X-ray diffraction analysis (XRD) conducted on the core member and the shell member made of the cBN sintered material showed the presence of peak of carbide and peak of nitride in the X-ray diffraction chart, and the ratio $I_C/I_N$ of peak intensity $I_C$ of the carbide to peak intensity $I_N$ of nitride was determined to be 0.42.

The sintered material was cut to predetermined dimensions by wire discharge cutting, each being brazed onto a mounting seat of a cemented carbide substrate, thereby to make a throwaway cutting tool having the configuration specified in JIS CNGA120408, that was subjected to cutting tests similarly to Example I. The samples experienced the amount of wear as small as 0.16 mm after cutting for 20 minutes, showed no chipping after being subjected to 60000 impacts in interrupted cutting test, thus exhibiting excellent cutting performance.

Example VII cBN material powder having a mean particle size of 2 μm, TiC material powder having a mean particle size of 1 μm, TiN material powder having a mean particle size of 1 μm, TiCN material powder having a mean particle size of 1 μm, TaC material powder having a mean particle size of 1 μm, ZrC material powder having a mean particle size of 1.2 μm, ZrN material powder having a mean particle size of 1.1 μm, WC material powder having a mean particle size of 0.9 μm, metal Al powder having a mean particle size of 1.2 μm and metal Co powder having a mean particle size of 0.8 μm were prepared in proportions shown in Table 7, and were mixed in a ball mill using alumina balls for 16 hours.

The mixed powder was press formed under a pressure of 98 MPa. This green compact was fired similarly to Example I except for employing the firing conditions shown in Table 7, instead of the conditions shown in Table 1 in an ultra-high pressure, high temperature apparatus, thereby to obtain the cBN sintered material (samples Nos. VII-1 to 12 shown in Table 7).

The samples of the cBN sintered material were used to make throwaway cutting tool having the configuration specified in JIS CNGA120408, similarly to Example I. Sample No. VII-11 was formed into a tool tip individually without brazing a piece of sintered material cut by wire discharge. Sample No. VII-12 was coated with TiAlN layer formed to a thickness of 1 μm by ion plating method at temperature of 500° C. with bias voltage of 30 V.

TABLE 7

| Sample No.[1] | Proportion (% by volume) | | | | | Firing condition | | | | Remarks |
|---|---|---|---|---|---|---|---|---|---|---|
| | cBN | Carbide | Nitride | Metal | Others | Temperature raising rate (° C./min.) | Firing temperature (° C.) | Firing period (minute) | Temperature lowering rate (° C./min.) | |
| VII-1 | the rest | TiC: 20 | TiN: 25 | Al: 10 | — | 50 | 1400 | 15 | 50 | Brazed tip |
| VII-2 | the rest | TiC: 10 WC: 7 | TiN: 13 | Al: 3 Co: 4 | — | 30 | 1350 | 30 | 45 | Brazed tip |
| VII-3 | the rest | ZrC: 15 | ZrN: 20 | Al: 10 | — | 40 | 1400 | 20 | 30 | Brazed tip |
| VII-4 | the rest | TaC: 5 | TiN: 15 | Al: 12 Co: 3 | — | 50 | 1375 | 25 | 50 | Brazed tip |
| * VII-5 | the rest | TiC: 35 | — | Al: 15 | — | 50 | 1400 | 10 | 100 | Brazed tip |
| * VII-6 | the rest | — | TiN: 40 | Al: 15 | — | 50 | 1400 | 10 | 100 | Brazed tip |
| * VII-7 | the rest | — | — | Al: 8 | TiCN: 37 | 50 | 1400 | 10 | 100 | Brazed tip |
| * VII-8 | the rest | TiC: 15 | TiN: 15 | Al: 15 | — | 20 | 1500 | 15 | 50 | Brazed tip |
| * VII-9 | the rest | TiC: 20 | TiN: 10 | Al: 15 | — | 50 | 1400 | 30 | 20 | Brazed tip |
| * VII-10 | the rest | TiC: 10 | TiN: 25 | Al: 8 | — | 100 | 1600 | 10 | 100 | Brazed tip |
| VII-11 | the rest | TiC: 20 | TiN: 25 | Al: 10 | — | 50 | 1400 | 15 | 50 | Individual tip |
| VII-12 | the rest | TiC: 20 | TiN: 25 | Al: 10 | — | 50 | 1400 | 15 | 50 | TiAlN coating |

[1]Samples marked '*' are out of the scope of the present invention.

(Intensities of X-Ray Diffraction Peaks)

The samples of cBN sintered material were subjected to X-ray diffraction analysis (XRD) similarly to Example III, and peak of carbide, peak of nitride and other peaks were identified. Peak intensity ratio shown in Table 8 was also determined.

(Residual Stress)

Residual stresses acting on the cBN particles and on the binder phase were calculated by X-ray residual stress measuring method ($2\theta - \sin^2 \phi$) using peaks observed at an angle of $2\theta \geq 100°$ using Fe-K$\alpha$ line for cBN and Cu-K$\alpha$ line for TiC and TiN of the binder phase, for example the peak attributed to (311) plane of cBN and the peak attributed to (422) plane of the binder phase. This calculation used modulus of elasticity E of 712 GPa and Poisson ratio of 0.215 for the cBN particles, modulus of elasticity E of 250 GPa and Poisson ratio of 0.19 for TiN and modulus of elasticity E of 400 GPa and Poisson ratio of 0.19 for TiC.

Residual stresses of sample No. VII-11 was measured in a sintered material that was cut out by wire discharging. Residual stress of sample No. VII-12 was measured in a state of the TiAlN layer being removed by electrolytic polishing.

(Cutting Test)

Continuous cutting test and interrupted cutting test were conducted on the cBN sintered materials similarly to Example I, except for setting the limit for the number of impacts experienced before chipping in the interrupted cutting test to 60000 instead of 40000. The results are shown in Table 8.

TABLE 8

| Sample No.[1] | Residual compressive stress | | | | | | Intensity of XRD analysis peak | | | |
|---|---|---|---|---|---|---|---|---|---|---|
| | $\sigma_{cBN}$ (MPa) | $\sigma_C$ (MPa) | $\sigma_N$ (MPa) | $\sigma_c/\sigma_N$ | $\sigma_b$ (MPa) | $\sigma_{cBN}/\sigma_b$ | cBN $I_{cBN}$ | Carbide $I_C$ | Nitride $I_N$ | Carbonitride $I_{CN}$ |
| VII-1 | 600 | 340 | 220 | 1.5 | 250 | 2.4 | 100 | 35 | 80 | 2 |
| VII-2 | 550 | 180 | 95 | 1.9 | 120 | 4.6 | 100 | 48 | 60 | 10 |
| VII-3 | 450 | 285 | 80 | 3.6 | 175 | 2.6 | 100 | 55 | 42 | — |
| VII-4 | 500 | 155 | 65 | 2.4 | 100 | 5.0 | 100 | 20 | 66 | — |
| * VII-5 | 200 | 85 | — | — | 85 | 2.4 | 100 | 68 | — | — |
| * VII-6 | 110 | — | 120 | — | 120 | 0.9 | 100 | — | 70 | — |
| * VII-7 | 280 | — | — | — | 120 | 2.3 | 100 | — | — | 52 |
| * VII-8 | 95 | — | — | — | 48 | 2.0 | 100 | — | — | 45 |
| * VII-9 | 180 | — | 100 | — | 100 | 1.8 | 100 | — | 2 | 40 |
| * VII-10 | 130 | 25 | — | — | 25 | 5.2 | 100 | 5 | — | 35 |
| VII-11 | 660 | 470 | 95 | 4.9 | 220 | 3.0 | 100 | 35 | 80 | 2 |
| VII-12 | 530 | 234 | 130 | 1.8 | 185 | 2.9 | 100 | 35 | 80 | 2 |

| Sample No.[1] | Intensity of XRD analysis peak | | | Intermediate phase | Continuous cutting test Amount of wear(mm) | Interrupted cutting test Number of impacts |
|---|---|---|---|---|---|---|
| | $I_C/I_N$ | $I_N/I_{cBN}$ | $I_C/I_{cBN}$ | | | |
| VII-1 | 0.41 | 0.85 | 0.35 | TiB$_2$, AlN | 0.14 | 45500 |
| VII-2 | 0.80 | 0.60 | 0.48 | TiB$_2$, WCoB | 0.13 | 39000 |
| VII-3 | 1.31 | 0.42 | 0.55 | No exist | 0.20 | 35500 |
| VII-4 | 0.30 | 0.66 | 0.20 | AlN | 0.15 | 30500 |
| * VII-5 | — | — | 0.68 | TiB$_2$, AlN | 0.25 | 12000 |
| * VII-6 | — | 0.70 | — | No exist | 0.28 | 16000 |
| * VII-7 | — | — | — | No exist | 0.20 | 14000 |
| * VII-8 | — | — | — | AlN, TiB$_2$ | 0.21 | 12000 |

TABLE 8-continued

| | | | | | | |
|---|---|---|---|---|---|---|
| * VII-9 | — | 0.02 | — | AlN | 0.26 | 14000 |
| * VII-10 | — | — | 0.05 | AlN, TiB$_2$ | 0.18 | 8000 |
| VII-11 | 0.44 | 0.80 | 0.35 | TiB$_2$, AlN | 0.14 | 53500 |
| VII-12 | 0.41 | 0.85 | 0.35 | TiB$_2$, AlN | 0.09 | 40000 |

[1])Samples marked '*' are out of the scope of the present invention.

The results shown in Tables 7 and 8 indicate that samples Nos. VII-5 to 10, wherein the residual compressive stress of the cBN particles was less than 300 MPa had weak binding between the cBN particles, and were therefore insufficient in chipping resistance which resulted in a short service life.

Samples Nos. VII-1 to 4, 11 and 12, wherein the residual compressive stress of the cBN particles was 300 MPa or higher, all had sufficient wear resistance with the amount of wear not larger than 0.20 mm in continuous cutting of carburizing-hardened steel, that is a hard-to-cut material, and exhibited excellent chipping resistance, in particular, with 30000 impacts or more before chipping in the interrupted cutting test and demonstrated stable cutting performance over an extended period of time.

Example VIII

The green compact of core member was made by extrusion molding of a powder material that was prepared by mixing 50% by volume of cBN, 37% by volume of TiN and 13% by volume of Al and adding an organic binder thereto. The green compact of shell member was made by extrusion molding of a material that was prepared by mixing 60% by volume of cBN, 30% by volume of TiC and 10% by volume of Al and adding an organic binder thereto.

The green compact of core member and the green compact of shell member made as described above were used to form composite green compact of multi-filament structure similarly to Example II and were fired thereby to make a composite cBN sintered material.

Analysis of diffraction intensity obtained from X-ray diffraction analysis (XRD) conducted on the core member and the shell of the composite cBN sintered material showed residual compressive stresses of $\sigma_{cBN}$=717 MPa and $\sigma_b$=281 MPa. Peaks of carbide and nitride were observed, and the ratio $I_C/I_N$ of peak intensity $I_C$ of the carbide to peak intensity $I_N$ of nitride was determined to be 0.42.

The sintered material was cut to predetermined dimensions by wire discharge cutting, each being brazed onto a mounting seat of a cemented carbide substrate, thereby to make a throw-away cutting tool having the configuration specified in JIS CNGA120408.

The measurement of residual stress of the tool tip made as described above showed residual compressive stresses of $\sigma_{cBN}$=535 MPa, $\sigma_{TiC}$=120 MPa and $\sigma_{TiN}$=220 MPa. The cutting tool was subjected to cutting tests similarly to Example I. The samples experienced the amount of wear as small as 0.16 mm after cutting for 20 minutes, showed no chipping after being subjected to 60000 impacts in interrupted cutting test, thus exhibiting excellent cutting performance.

Example IX

A cBN material powder having a mean particle size of 1.5 μm, a TiC material powder having a mean particle size of 1 μm, a TiN material powder having a mean particle size of 1 μm, a TiCN material powder having a mean particle size of 1 μm, a HfC material powder having a mean particle size of 1 μm, a NbC material powder having a mean particle size of 1 μm, a metal Al powder having a mean particle size of 1.2 μm and a metal Co powder having a mean particle size of 0.8 μm were prepared in proportions shown in Table 9, and were mixed in a ball mill using alumina balls for 16 hours.

The mixed powder was press formed under a pressure of 98 MPa. This green compact was fired while maintaining a pressure of 5 GPa and a temperature of 1400° C. for 15 minutes in an ultra-high pressure, high temperature apparatus, thereby to obtain the cBN sintered material (samples Nos. IX-1 to 9 shown in Table 9).

TABLE 9

| Sample No.[1]) | Proportion (% by volume) | | | | | Firing condition | | | |
|---|---|---|---|---|---|---|---|---|---|
| | | | | | | Temperature raising rate | Firing temperature | Firing period | Temperature lowering rate |
| | cBN | Carbide | Nitride | Metal | Others | (° C./min.) | (° C.) | (minute) | (° C./min.) |
| IX-1 | the rest | TiC: 20 | TiN: 25 | Al: 10 | — | 50 | 1400 | 15 | 50 |
| IX-2 | the rest | TiC: 8 WC: 4 | TiN: 18 | Al: 5 Co: 3 | — | 35 | 1400 | 15 | 35 |
| IX-3 | the rest | HfC: 23 | TiN: 8 | Al: 13 | — | 40 | 1400 | 15 | 40 |
| IX-4 | the rest | TiC: 5 | TiN: 10 | Al: 10 Co: 5 | — | 45 | 1400 | 15 | 45 |
| IX-5 | the rest | TiC: 8 | TiN: 10 | Al: 14 | — | 50 | 1420 | 15 | 50 |
| * IX-6 | the rest | TiC: 45 | — | Al: 15 | — | 35 | 1375 | 15 | 35 |
| * IX-7 | the rest | — | TiN: 35 | Al: 15 | — | 45 | 1300 | 30 | 45 |
| * IX-8 | the rest | — | — | Al: 8 | TiCN: 30 | 50 | 1400 | 15 | 50 |
| * IX-9 | the rest | TiC: 21 NbC: 10 | TiN: 3 | Al: 3 Co: 3 | — | 40 | 1500 | 15 | 40 |

[1])Samples marked '*' are out of the scope of the present invention.

The samples of the cBN sintered material were cut by wire discharge cutting or the like into shape specified in JIS CNGA120408, each being brazed onto a mounting seat of a cemented carbide substrate. Each tool tip of the cBN sintered material that was brazed was coated with a hard film according to the composition and film forming method shown in Table 11, thereby to make throwaway cutting tool made of the cBN sintered material coated with the hard film (surface-coated cBN sintered material). The hard film was formed by ion plating method at temperature of 500° C. with bias voltage of 150 V.

The cutting tools obtained as described above were evaluated for the contents of components, peak diffraction intensity, film thickness, ratio $[I_{(111)}/I_{(200)}]$, residual compressive stress, continuous cutting test and interrupted cutting test, by the methods as follows. The results of measuring the contents of components and peak diffraction intensity are shown in Table 10, and the results of measuring film thickness, ratio $[I_{(111)}/I_{(200)}]$, residual compressive stress, continuous cutting test and interrupted cutting test are shown in Table 11.

(Contents of Components)

Contents of components in each of the cutting tools were determined through observation of the structure under a metallurgical microscope similarly to Example I.

As to carbonitride, the presence was determined by the X-ray diffraction peak. When the peak was observed, peak of carbide, peak of nitride and peak of carbonitride were quantified through peak separation, and the content of carbonitride was calculated from the proportions of the peak intensities.

(Intensities of a Diffraction Peaks)

X-ray diffraction analysis was conducted similarly to Example III. From the diffraction chart, normalized peak intensities $I_C$, $I_N$, $I_{IL}$, and $I_{CN}$ were calculated assuming $I_{cBN}$ to be 100.

(Thickness of Hard Film)

Thickness of the hard film was measured by observing the rupture surface of the surface-coated cBN sintered material under a scanning electron microscope.

(Ratio $[I_{(111)}/I_{(200)}]$ of X-Ray Diffraction Peaks of Hard Film)

Intensity $I_{(111)}$ of a Diffraction Peak Attributed to (111) plane and intensity $I_{(200)}$ of a diffraction peak attributed to (200) plane of the hard film were measured by X-ray diffraction analysis, and the ratio $[I_{(111)}/I_{(200)}]$ was calculated.

(Residual Compressive Stress of cBN Sintered Material)

Residual stresses acting on the cBN particles and on the hard film were determined similarly to Example VII. In the case of hard film constituted from a plurality of layers, the residual stress of the thickest layer of the hard film was measured.

(Cutting Test)

Continuous cutting test and interrupted cutting test were conducted similarly to Example I, except for setting the limit for the number of impacts experienced before chipping in the interrupted cutting test to 60000 instead of 40000.

TABLE 10

| Sample No.[1] | Content proportion in sintered material[2] (% by area) | | | | | Proportion of X-ray peak intensity in sintered material[3] | | | | | | |
|---|---|---|---|---|---|---|---|---|---|---|---|---|
| | cBN | Carbide | Nitride | Intermediate phase | Carbonitride | $I_{cBN}$ | $I_C$ | $I_N$ | $I_{IL}$ | $I_{CN}$ | $I_C/I_N$ | $I_{IL}/I_{cBN}$ |
| IX-1 | 44 | 18 | 25 | 11 | 2 | 100 | 44 | 79 | 63 | 2 | 0.56 | 0.63 |
| IX-2 | 51 | 17 | 15 | 16 | 1 | 100 | 53 | 67 | 77 | 12 | 0.79 | 0.77 |
| IX-3 | 71 | 18 | 6 | 5 | — | 100 | 33 | 51 | 10 | — | 0.65 | 0.10 |
| IX-4 | 77 | 3 | 7 | 13 | — | 100 | 19 | 86 | 42 | — | 0.22 | 0.42 |
| IX-5 | 65 | 10 | 19 | 4 | 2 | 100 | 26 | 65 | 27 | 5 | 0.40 | 0.27 |
| * IX-6 | 45 | 38 | — | 13 | 3 | 100 | 87 | — | 32 | 8 | — | 0.32 |
| * IX-7 | 52 | — | 35 | 17 | — | 100 | — | 70 | 56 | — | — | 0.56 |
| * IX-8 | 60 | — | — | 15 | 25 | 100 | — | — | 51 | 41 | — | 0.51 |
| * IX-9 | 62 | 22 | — | 2 | 14 | 100 | 27 | — | 9 | 38 | — | 0.09 |

[1] Samples marked '*' are out of the scope of the present invention.
[2] Content proportion: cBN particles, carbide and nitride were observed under a metallurgical microscope, The content of carbonitride was calculated from XRD peak.
[3] Proportion of X-ray diffraction peak intensity in sintered materia $I_{cBN}$: cBN (111) plane diffraction peak, , $I_N$: Nitride (200) plane diffraction peak, $I_C$: Carbide (200) plane diffraction peak, $I_{IL}$: Intermediate phase (101) plane diffraction peak, $I_{CN}$: Carbonitride (200) plane diffraction peak

TABLE 11

| Sample No.[1] | Hard coating[2][3] | | | | Coating method | Residual compressive stress[4] | | Continuous cutting test | Interrupted cutting test |
|---|---|---|---|---|---|---|---|---|---|
| | First layer | Second layer | Third layer | Fourth layer | | cBN (MPa) | Coating (film) (GPa) | Amount of wear (mm) | Number of impacts |
| IX-1 | (Ti$_{0.5}$, Al$_{0.5}$)N (1.7)[1.5] | — | — | — | Ion plating | 500 | 2.2 | 0.12 | 50000 |
| IX-2 | TiN (0.1)[3.1] | TiCN (6.0)[0.7] | Al$_2$O$_3$ (3.0)[—] | TiN (0.1)[2.2] | Thermal CVD | 900 | −0.3 | 0.10 | 39000 |
| IX-3 | Ti (0.1)[—] | TiN (1.5)[2.0] | — | — | Ion plating | 600 | 1.2 | 0.13 | 40000 |
| IX-4 | TiN (0.1)[2.0] | (Ti$_{0.2}$, Al$_{0.7}$Cr$_{0.1}$)N (1.0)[1.0] | — | — | Ion plating | 400 | 0.9 | 0.14 | 45000 |
| IX-5 | TiCN (1.8)[1.2] | — | — | — | Sputtering | 250 | 1.4 | 0.18 | 40000 |
| * IX-6 | (Ti$_{0.5}$, Al$_{0.5}$)N (2.0)[0.8] | TiN (0.2)[1.7] | — | — | Ion plating | 150 | 1.2 | 0.21 | 13000 |
| * IX-7 | TiN (1.0)[2.0] | — | — | — | Ion plating | 160 | 1.3 | 0.23 | 8500 |

TABLE 11-continued

| | Hard coating[2)3)] | | | | | Residual compressive stress[4)] | | Continuous cutting test | Interrupted cutting test |
|---|---|---|---|---|---|---|---|---|---|
| Sample No.[1)] | First layer | Second layer | Third layer | Fourth layer | Coating method | cBN (MPa) | Coating (film) (GPa) | Amount of wear (mm) | Number of impacts |
| * IX-8 | TiCN (2.5)[0.9] | — | — | — | Ion plating | 200 | 2 | 0.20 | 12000 |
| * IX-9 | — | — | — | — | — | 150 | — | 0.31 | 28000 |

[1)]Samples marked '*' are out of the scope of the present invention.
[2)]Figures in round brackets ( ) stand for a film thickness of hard film. (unit: μm)
[3)]Figures in square brackets [ ] stand for a ratio [$I_{(111)}/I_{(200)}$] of the (111) plane peak intensity to the (200) plane peak intensity in XRD.
[4)]The figure with a minus sign stands for tensile residual stress.

The results shown in Tables 9 to 11 indicate that samples Nos. IX-6 and 9, wherein the sintered material contained only carbide (TiC), had weak binding between the cBN particles, and were therefore insufficient in chipping resistance. Sample No. IX-7, wherein the sintered material contained only nitride (TiN), had insufficient wear resistance and short service life. Sample No. IX-8, wherein carbonitride (TiCN) was used as the binder phase, was insufficient in both wear resistance and chipping resistance. Sample No. IX-9, wherein hard film was not provided, was insufficient in both wear resistance and chipping resistance.

Samples Nos. IX-1 to 5 that were within the scope of the present invention, all had sufficient wear resistance with the amount of wear not larger than 0.20 mm in continuous cutting of carburizing-hardened steel, that is a hard-to-cut material, and endured 35000 or more impacts before chipping in the interrupted cutting test. Sample No. IX-1, in particular, showed no chipping after experiencing 50000 impacts, thus exhibited excellent chipping resistance and demonstrated stable cutting performance over an extended period of time.

Example X

The green compact of core member was made by extrusion molding of a powder material that was prepared by mixing 50% by volume of cBN, 35% by volume of TiN and 15% by volume of Al and adding an organic binder thereto. The green compact of shell member was made by extrusion molding of a material that was prepared by mixing 65% by volume of cBN, 25% by volume of TiC and 10% by volume of Al and adding an organic binder thereto.

The green compact of core member and the green compact of shell member made as described above were used to form composite green compact of multi-filament structure similarly to Example II and were fired thereby to make a composite cBN sintered material.

The samples of the cBN sintered material were cut by wire discharge cutting into predetermined dimensions (shape specified in JIS CNGA120408), each being brazed onto a mounting seat of a cemented carbide substrate. The cBN sintered material that was brazed was coated with ($Ti_{0.5}$, $Al_{0.5}$)N film to a thickness of 2.0 μm on the surface thereof by cathode arc ion plating, thereby to make a cutting tool (sample No. X-1) made of the surface-coated cBN sintered material.

The structure of the cutting tool thus obtained was observed under a metallurgical microscope. The cBN particles appearing in black, TiC appearing in brown and TiN appearing in white were clearly distinguished. Areas of 30 grains of each component were measured by image analysis and were averaged. Proportions of the areas occupied by the components were calculated through comparison of these mean values, with the results of 50% for cBN, 10% for TiC, 25% for TiN and 2% for TiCN.

Through X-ray diffraction analysis (XRD) of the hard film of the cutting tool described above, intensity $I_{(111)}$ of a diffraction peak attributed to (111) plane and intensity $I_{(200)}$ of a diffraction peak attributed to (200) plane were measured similarly to Example IX, and the ratio [$I_{(111)}/I_{(200)}$] was determined to be 1.8.

The sample was subjected to cutting test similarly to Example IX, in which it experienced the amount of wear as small as 0.15 mm after cutting for 20 minutes, and showed no chipping after being subjected to 60000 impacts in the interrupted cutting test, thus exhibiting excellent cutting performance.

Example XI

The same cBN sintered material as that of sample No. IX-1 shown in Table 9 was made by a method similar to that of Example IX. The cBN sintered material was cut by wire discharge cutting into predetermined shape and was brazed onto a mounting seat of a throwaway tool tip made of cemented carbide of milling cutter, thus making a cutting tool similarly to Example IX except for forming a diamond-like carbon film having thickness of 0.2 μm by plasma CVD process (sample No. XI-1).

The same cBN sintered material as that of sample No. IX-8 shown in Table 9 was made. The cBN sintered material was cut by wire discharge cutting into predetermined shape and was brazed onto a mounting seat of a throwaway tool tip made of cemented carbide of milling cutter, thus making a cutting tool similarly to Example IX except for forming a diamond-like carbon film having thickness of 0.2 μm by plasma CVD process (sample No. XI-2).

The cutting tools made as described above were subjected to cutting performance test under the following conditions.
Mode of cutting: Milling
Workpiece: Ti-16Al-4V alloy
Cutting speed: 500 m/min.
Infeed: 1.0 mm
Feed rate: 0.3 mm/blade
Measurement: Condition of cutting edge was observed by a scanning electron microscope when the length of cutting reached 1 m.

In the cutting test, sample No. XI-2 was damaged on the cutting edge that showed chipping and peel-off of the film, while sample No. XI-1 remained sound with the cutting edge showing no chipping nor peel-off of the film.

The invention claimed is:

1. A cubic boron nitride sintered material constituted from cubic boron nitride particles that are bound by a binder phase, wherein said binder phase contains a carbide of at least one kind of metal element selected from among metals of groups 4, 5 and 6 of the periodic table and a nitride of at least one kind of metal element selected from among metals of groups 4, 5 and 6 of the periodic table coexisting therein, wherein the proportion of the carbonitride content of at least one kind of metal element selected from among metals of groups 4, 5 and 6 of the periodic table is 5% by weight or less to the entire cubic boron nitride sintered material, and wherein the residual compressive stress $\sigma_{cBN}$ of 300 MPa or more remains on said cubic boron nitride particles.

2. A cubic boron nitride sintered material having such a single-filament fiber-like structure that a shell member made of the cubic boron nitride sintered material constituted from cubic boron nitride particles that are bound by a binder phase made of nitride of at least one kind of metal element selected from among metals of groups 4, 5 and 6 of the periodic table covers the circumferential surface of a fiber-like core member made of the cubic boron nitride sintered material constituted from cubic boron nitride particles that are bound by a binder phase made of carbide of at least one kind of metal element selected from among metals of groups 4, 5 and 6 of the periodic table, wherein the proportion of the carbonitride content of at least one kind of metal element selected from among metals of groups 4, 5 and 6 of the periodic table is 5% by weight or less to the entire cubic boron nitride sintered material.

3. A cubic boron nitride sintered material having such a single-filament fiber-like structure that a shell member made of the cubic boron nitride sintered material constituted from cubic boron nitride particles that are bound by a binder phase made of carbide of at least one kind of metal element selected from among metals of groups 4, 5 and 6 of the periodic table covers the circumferential surface of a fiber-like core member made of the cubic boron nitride sintered material constituted from cubic boron nitride particles that are bound by a binder phase made of nitride of at least one kind of metal element selected from among metals of groups 4, 5 and 6 of the periodic table, wherein the proportion of the carbonitride content of at least one kind of metal element selected from among metals of groups 4, 5 and 6 of the periodic table is 5% by weight or less to the entire cubic boron nitride sintered material.

4. A cubic boron nitride sintered material which has a multi-filament fiber-like structure constituted from a plurality of single-filament fiber-like structures, according to claim 2 or 3, bundled together.

5. The cubic boron nitride sintered material according to any one of claims 1 to 3, wherein the metal element that constitutes said carbide and the metal element that constitutes said nitride are the same metal element.

6. The cubic boron nitride sintered material according to claim 5, wherein said metal element is titanium.

7. The cubic boron nitride sintered material according to any one of claims 1 to 3, wherein a ratio ($p_C/p_N$) of the proportion of the content area $p_C$ of the carbide in the entire cubic boron nitride sintered material to the proportion of the content area $p_N$ of the nitride which is the component of said binder phase is in a range from 0.2 to 3.0.

8. The cubic boron nitride sintered material according to any one of claims 1 to 3, wherein an intermediate phase is provided on the circumference of said cubic boron nitride particles, that contains a compound, other than the component of said binder phase, which is one of carbide, nitride, carbonitride, boride, borocarbide, boronitride and oxide of at least one metal element selected from among metals of groups 4, 5 and 6 of the periodic table, iron group metals and Al.

9. The cubic boron nitride sintered material according to claim 8, wherein the proportion of the content $p_{cBN}$ of said cubic boron nitride particles to the entire cubic boron nitride sintered material is in a range from 45 to 80% by area, the proportion of the content $p_c$ of said carbide is in a range from 2 to 45% by area, the proportion of the content $p_N$ of said nitride which is the component of said binder phase is in a range from 3 to 50% by area, and the proportion of the content $p_m$ of said intermediate phase is in a range from 0 to 25% by area.

10. The cubic boron nitride sintered material according to claim 8, wherein a ratio ($I_{IL}/I_{cBN}$) of the intensity $I_{IL}$ of a diffraction peak attributed to (101) plane of said intermediate phase to intensity $I_{cBN}$ of a diffraction peak attributed to (111) plane of the cubic boron nitride particles is in a range from 0.1 to 0.8 in said X-ray diffraction analysis.

11. The cubic boron nitride sintered material according to any one of claims 1 to 3, wherein the proportion of the content of carbonitride that is a solid solution of said carbide and said nitride to the entire cubic boron nitride sintered material is 5% by weight or less.

12. The cubic boron nitride sintered material according to any one of claims 1 to 3, wherein a peak attributed to said nitride which is the component of said binder phase and a peak attributed to said carbide coexist in X-ray diffraction analysis.

13. The cubic boron nitride sintered material according to claim 12, wherein a ratio ($I_C/I_N$) of the intensity $I_C$ of a diffraction peak attributed to (200) plane of said carbide to the intensity $I_N$ of a diffraction peak attributed to (200) plane of said nitride is in a range from 0.2 to 1.2 in said X-ray diffraction analysis.

14. The cubic boron nitride sintered material according to claim 12, wherein a ratio ($I_N/I_{cBN}$) of the intensity $I_N$ of a diffraction peak of said nitride to the intensity $I_{cBN}$ of a diffraction peak attributed to (111) plane of said cubic boron nitride particles is in a range from 0.3 to 1 in said X-ray diffraction analysis.

15. The cubic boron nitride sintered material according to claim 12, wherein a ratio ($I_C/I_{cBN}$) of the intensity $I_C$ of a diffraction peak of said carbide to intensity $I_{cBN}$ of a diffraction peak attributed to (111) plane of said cubic boron nitride particles is in a range from 0.1 to 0.9 in said X-ray diffraction analysis.

16. The cubic boron nitride sintered material according to claim 12, wherein the intensity $I_{CN}$ of a diffraction peak attributed to (200) plane of carbonitride, that is a solid solution of said carbide and said nitride, and the peak intensities $I_C$ and $I_N$ satisfy relationships of $I_{CN}<0.3\ I_C$ and $I_{CN}<0.3\ I_N$ in said X-ray diffraction analysis.

17. The cubic boron nitride sintered material according to any one of claims 1 to 3, wherein a ratio ($d_N/d_C$) of the mean particle size $d_N$ calculated from equivalent circles corresponding to areas of individual grains of said nitride which is the component of said binder phase to the mean particle size $d_C$ calculated from equivalent circles corresponding to areas of individual grains of said carbide located between the cubic boron nitride particles, measured by observing the cross section of the cubic boron nitride sintered material, is in a range from 0.4 to 1.2.

18. The cubic boron nitride sintered material according to claim 17 wherein the mean particle size $d_{cBN}$ determined from equivalent circles corresponding to areas of individual cubic boron nitride particles is 5 μm or smaller, the mean particle size dc of said carbide is in a range from 1 to 3 μm and the mean particle size $d_N$ of said nitride is in a range from 0.5 to 2 μm, as determined through observation of cross section of said cubic boron nitride sintered material.

19. The cubic boron nitride sintered material according to claim 2 to 3, wherein the residual compressive stress $\sigma_{cBN}$ of 300 MPa or more remains on said cubic boron nitride particles.

20. The cubic boron nitride sintered material according to claim 19, wherein the residual compressive stress $\sigma_b$ remains in said binder phase and ratio ($\sigma_{cBN}/\sigma_b$) of the residual compressive stress $\sigma_{cBN}$ to the residual compressive stress $\sigma_b$ is in a range from 2 to 5.

21. The cubic boron nitride sintered material according to claim 20, wherein the residual compressive stress $\sigma_b$ remaining in said binder phase is in a range from 60 to 300 MPa.

22. The cubic boron nitride sintered material according to claim 19, wherein the ratio ($\sigma_C/\sigma_N$) of the residual compressive stress $\sigma_C$ acting on said carbide to the residual compressive stress $\sigma_N$ acting on said nitride in said binder phase in a range from 1.5 to 5.

23. The cubic boron nitride sintered material according to claim 22, wherein the residual compressive stress $\sigma_N$ acting on said nitride is in a range from 30 to 200 MPa and the residual compressive stress $\sigma_C$ acting on said carbide is in a range from 100 to 700 MPa.

24. The cubic boron nitride sintered material according to any one of claims 1 to 3, wherein the surface of said cubic boron nitride sintered material is coated with at least one layer of a hard film constituted from at least one kind of carbide, nitride, boride, oxide and carbonitride of at least one metal element selected from among the metals of groups 4, 5 and 6 of the periodic table, Al and Si and solid solution thereof, hard carbon and boron nitride.

25. The cubic boron nitride sintered material according to claim 24, wherein said hard film is formed by physical vapor deposition (PVD) method.

26. The cubic boron nitride sintered material according to claim 24, wherein total thickness of said hard film is in a range from 0.1 to 15 μm.

27. The cubic boron nitride sintered material according to claim 24, wherein the residual compressive stress remaining in said hard film is in a range from 0.1 to 30 GPa.

28. The cubic boron nitride sintered material according to claim 24, wherein the residual compressive stress of the cubic boron nitride sintered material in the state of being coated with said hard film is 200 MPa or higher.

29. The cubic boron nitride sintered material according to claim 24, wherein at least one layer of said hard film is formed from a compound represented by the following general formula (1):

[Chemical Formula 3]

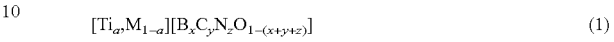   (1)

wherein M represents at least one kind of metal element selected from among elements, except for Ti, of groups 4, 5 and 6 of the periodic table, Al and Si, $0<a\leq1$, $0\leq x\leq1$, $0\leq y\leq1$ and $0\leq z\leq1$.

30. The cubic boron nitride sintered material according to claim 29 wherein at least one layer of said hard film is formed from a compound represented by the following general formula (2):

[Chemical Formula 4]

   (2)

wherein M represents at least one kind of metal element selected from among elements, except for Ti, of groups 4, 5 and 6 of the periodic table, Al and Si, $0.3\leq a\leq0.7$, $0\leq x\leq0.5$, $0\leq y\leq0.5$, $0.5\leq z\leq1$ and $x+y+z\leq1$.

31. The cubic boron nitride sintered material according to claim 24, wherein a ratio $[I_{(111)}/I_{(200)}]$ of the intensity $I_{(111)}$ of a diffraction peak attributed to (111) plane to the intensity $I_{(200)}$ of a diffraction peak attributed to (200) plane measured in X-ray diffraction analysis of at least one layer of said hard film is 0.7 or higher.

32. A cutting tool made of the cubic boron nitride sintered material according to any one of claims 1 to 3, that is used in cutting operation by pressing a cutting edge, formed along a ridge where a flank and a rake face thereof meet, against a workpiece to be cut.

33. The cutting tool according to claim 32 comprising a tool body and a tool tip brazed onto a mounting seat of said tool body, wherein the tool tip is made of said cubic boron nitride sintered material.

* * * * *